(12) United States Patent (10) Patent No.: US 12,612,551 B2

Laut et al. (45) Date of Patent: Apr. 28, 2026

(54) LIQUID CRYSTAL MEDIUM

(71) Applicant: MERCK PATENT GmbH, Darmstadt (DE)

(72) Inventors: Sven Christian Laut, Darmstadt (DE); Hee-Kyu Lee, Shanghai (CN); Jing Wang, Shanghai (CN); Aaron Lackner, Darmstadt (DE); Dmitry Ushakov, Darmstadt (DE); Rocco Fortte, Darmstadt (DE); Philipp Wucher, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 18/982,130

(22) Filed: Dec. 16, 2024

(65) Prior Publication Data

US 2025/0207032 A1 Jun. 26, 2025

(30) Foreign Application Priority Data

Dec. 26, 2023 (WO) ................ PCT/CN2023/141868

(51) Int. Cl.
| | |
|---|---|
| *G02F 1/1333* | (2006.01) |
| *C09K 19/06* | (2006.01) |
| *C09K 19/12* | (2006.01) |
| *C09K 19/30* | (2006.01) |
| *C09K 19/32* | (2006.01) |
| *C09K 19/34* | (2006.01) |

(52) U.S. Cl.
CPC ........ C09K 19/3003 (2013.01); C09K 19/066 (2013.01); C09K 19/12 (2013.01); C09K 19/32 (2013.01); C09K 19/3402 (2013.01); *C09K 2019/122* (2013.01); *C09K 2019/123* (2013.01); *C09K 2019/124* (2013.01); *C09K 2019/3015* (2013.01); *C09K 2019/3019* (2013.01); *C09K 2019/3025* (2013.01); *C09K 2019/3425* (2013.01); *C09K 2219/15* (2013.01)

(58) Field of Classification Search
CPC ............ C09K 19/3003; C09K 19/3015; G02F 1/1333
See application file for complete search history.

(56) References Cited

U.S. PATENT DOCUMENTS

| | | | |
|---|---|---|---|
| 5,576,867 A | 11/1996 | Baur et al. | |
| 5,993,691 A | 11/1999 | Pausch et al. | |
| 6,027,665 A | 2/2000 | Pausch et al. | |
| 6,146,720 A | 11/2000 | Pausch et al. | |
| 7,695,777 B2 * | 4/2010 | Goto ...................... | C09K 19/54 252/299.61 |
| 8,470,199 B2 * | 6/2013 | Kobayashi .............. | C07C 25/18 349/1 |
| 2001/0010576 A1 | 8/2001 | Lee et al. | |
| 2006/0066793 A1 | 3/2006 | Ohmuro et al. | |
| 2025/0207032 A1 * | 6/2025 | Laut ...................... | C09K 19/12 |
| 2025/0215323 A1 * | 7/2025 | Wang ................ | C09K 19/3098 |

FOREIGN PATENT DOCUMENTS

| | | | | |
|---|---|---|---|---|
| DE | 19528106 A1 | 8/1996 | | |
| DE | 19509410 A1 | 9/1996 | | |
| DE | 19528107 A1 | 9/1996 | | |
| DE | 19528104 A1 | 2/1997 | | |
| DE | 19824137 A1 | 7/1999 | | |
| EP | 0588568 A2 | 3/1994 | | |
| EP | 0667555 A1 | 8/1995 | | |
| EP | 0673986 A2 | 9/1995 | | |
| EP | 1897928 A1 | 3/2008 | | |
| JP | 58-222042 A | * 12/1983 | ............... | G02F 1/13 |
| JP | H07181439 A | 7/1995 | | |
| WO | 9110936 A1 | 7/1991 | | |
| WO | 9623851 A1 | 8/1996 | | |
| WO | 9628521 A1 | 9/1996 | | |

OTHER PUBLICATIONS

Machine translation of JP 58-222042 A (Year: 1983).*

Jung et al., "Analysis of Optimal Phase Retardation of a Fringe Field-Driven Homogeneously Aligned Nematic Liquid Crystal Cell", Japanese Journal of Applied Physics, vol. 43, No. 3, month unknown 2004, 5 pages.

Soref, "Field effects in nematic liquid crystals obtained with interdigital electrodes", Journal of Applied Physics, vol. 45, No. 12, Dec. 12, 1974, 4 pages.

* cited by examiner

*Primary Examiner* — Geraldina Visconti

(74) *Attorney, Agent, or Firm* — Buchanan Ingersoll & Rooney PC

(57) ABSTRACT

Liquid-crystalline (LC) media having positive dielectric anisotropy and liquid-crystal displays (LCDs) containing these media, especially displays addressed by an active matrix and in particular LC displays of the TN, PS-TN, STN, TN-TFT, OCB, IPS, PS-IPS, FFS, HB-FFS, XB-FFS, PS-FFS, SA-HB-FFS, SA-XB-FFS, polymer stabilised SA-HB-FFS, polymer stabilised SA-XB-FFS, positive VA or positive PS-VA type.

15 Claims, No Drawings

LIQUID CRYSTAL MEDIUM

CROSS-REFERENCE TO RELATED APPLICATIONS

This application filed under 35 U.S.C. § 111(a) claims priority benefit under 35 U.S.C. §§ 119(a) and 365(a) of and to PCT International Application No. PCT/CN2023/141868, filed Dec. 26, 2023, the entire contents of which are incorporated herein by reference in their entirety and for all purposes.

BACKGROUND OF THE INVENTION

The present invention relates to liquid-crystalline (LC) media having positive dielectric anisotropy and to liquid-crystal displays (LCDs) containing these media, especially to displays addressed by an active matrix and in particular to LC displays of the TN, PS-TN, STN, TN-TFT, OCB, IPS, PS-IPS, FFS, HB-FFS, PS-HB-FFS, SA-HB-FFS, polymer stabilised SA-HB-FFS, positive VA or positive PS-VA type.

Liquid-crystal displays (LCDs) are used in many areas for the display of information. LCDs are used both for direct-view displays and for projection-type displays. The electro-optical modes used are, for example, the twisted nematic (TN), super twisted nematic (STN), optically compensated bend (OCB) and electrically controlled birefringence (ECB) modes together with their various modifications, as well as others. All these modes utilise an electric field which is generated substantially perpendicular to the substrates and the liquid-crystal layer.

Besides these modes, there are also electro-optical modes that utilise an electric field which is substantially parallel to the substrates or the liquid-crystal layer. For example, WO 91/10936 discloses a liquid-crystal display in which the electric signals are generated in such a way that the electric fields have a significant component parallel to the liquid-crystal layer, and which has since then become known as in-plane switching IPS) display. The principles of operating such a display are descried, for example, by R. A. Soref in Journal of Applied Physics, Vol. 45, No. 12, pp. 5466-5468 (1974).

IPS displays contain an LC layer between two substrates with planar orientation, where the two electrodes are arranged on only one of the two substrates and preferably have interdigitated, comb-shaped structures. On application of a voltage to the electrodes an electric field with a significant component parallel to the LC layer is generated between them. This causes realignment of the LC molecules in the layer plane.

EP 0 588 568, for example, discloses various possibilities for the design of the electrodes and for addressing an IPS display. DE 198 24 137 likewise describes various embodiments of such IPS displays.

Liquid-crystalline materials for IPS displays of this type are described, for example, in DE19528104.

Furthermore, so-called "fringe-field switching" (FFS) displays have been reported (see, inter alia, S. H. Jung et al., Jpn. J. Appl. Phys., Volume 43, No. 3, 2004, 1028), which contain two electrodes on the same substrate, one of which is structured in a comb-shaped manner and the other is unstructured. A strong, so-called "fringe field" is thereby generated, i.e., a strong electric field close to the edge of the electrodes, and, throughout the cell, an electric field which has both a strong vertical component and also a strong horizontal component. FFS displays have a low viewing-angle dependence of the contrast. FFS displays usually contain an LC medium with positive dielectric anisotropy, and an alignment layer, usually of polyimide, which provides planar alignment to the molecules of the LC medium.

Liquid-crystal displays of the IPS and FFS electro-optical mode are in particular suitable for use in modern desktop monitors, TV sets and multimedia applications but also for mobile phones and tablet PC's and the like. The liquid-crystalline media according to the present invention are preferably used in displays of this type. In general, dielectrically positive liquid-crystalline media having rather lower values of the dielectric anisotropy are used in FFS displays, but in some cases liquid-crystalline media having a dielectric anisotropy of only about 3 or even less are also used in IPS displays.

A further improvement has been achieved by the so-called HB-FFS mode. One of the unique features of the HB-FFS mode in contrast to the traditional FFS technology is that it enables higher transmittance which allows operation of the panel with less energy consumption.

Liquid-crystal compositions which are suitable for LCDs and especially for FFS and IPS displays are known in prior art, for example, from JP 07-181 439 (A), EP 0 667 555, EP 0 673 986, DE 195 09 410, DE 195 28 106, DE 195 28 107, WO 96/23 851 and WO 96/28 521. However, these compositions have certain disadvantages. Amongst other deficiencies, most of them result in disadvantageously long addressing times, have inadequate values of the resistivity and/or require excessively high operating voltages. Both an improvement in the operating properties and also in the shelf life are necessary here.

FFS and IPS displays can be operated as active-matrix displays (AMD) or passive-matrix displays (PMD). In the case of active-matrix displays individual pixels are usually addressed by integrated, non-linear active elements such as, for example, thin-film transistors (TFTs), while in the case of passive-matrix displays individual pixels are usually addressed by the multiplex method as known from the prior art.

The displays according to the present invention are preferably addressed by an active matrix, preferably by a matrix of TFT. However, the liquid crystals according to the invention can also advantageously be used in displays having other known addressing means.

Both the IPS and the FFS technology have certain advantages over other LCD technologies, such as, for example, the vertical alignment (VA) technology, e.g., a broad viewing angle dependency of the contrast.

The provision of further liquid-crystalline media and the use thereof in a display having high transmission, a good black state and a high contrast ratio is a central challenge for modern FFS and IPS applications. In addition, modern applications also require good low-temperature stability and fast addressing times. The contrast can be improved by a higher transmittance in the bright state and a better dark state. One solution to improve the dark state is to lower the scattering parameter of the LC mixture by developing mixtures with a higher average elastic constant ($K_{av}$) but this normally has the drawback of reduced response time.

It was observed that a high brightness in displays like those of the HB-FFS mode can be achieved by using liquid-crystalline media having positive dielectric anisotropy and also having an increased dielectric constant $\varepsilon_\perp$ perpendicular to the longitudinal axes of the liquid-crystalline molecules. This can be achieved by adding a limited amount of liquid-crystalline compounds with negative dielectric anisotropy, which have high $\varepsilon_\perp$ properties, to the liquid-crystalline medium whilst maintaining a positive dielectric anisotropy of the entire medium. However, the addition of compounds with high $\varepsilon_\perp$ has some drawbacks. For example, this can lead to higher values of the rotational viscosity $\gamma_1$, and consequently to higher values of the ratio $\gamma_1/K_{22}$ of the rotational viscosity $\gamma_1$ and the elastic constant $K_{22}$ for twist deformation, which leads to higher response times. Since $K_{22}$ is approximately proportional to the elastic constant $K_{11}$ for splay deformation (the value of $K_{22}$ is typically about half the value of $K_{11}$), this can easily be determined by measuring $\gamma_1$ and $K_{11}$.

Another disadvantage is that the reliability (VHR) of HB-FFS mixtures can be worse compared to conventional FFS mixtures.

It is also important to maintain a good low-temperature stability (LTS) of the medium. In particular for car navigation systems a good LTS even at $-40°$ C. is necessary. Due to this requirement, it is challenging to further improve the optical performance.

The invention has the object of providing liquid-crystalline media, preferably for FFS and IPS displays, in particular for HB-FFS displays, but also for TN, positive VA or STN displays, and in particular for active-matrix displays like those addressed by TFTs, which do not exhibit the disadvantages indicated above or only do so to a lesser extent, and in particular to provide a medium that enables a display with improved contrast preferably without deterioration of other display parameters.

SUMMARY OF THE INVENTION

The present invention relates to a liquid-crystal medium preferably with positive dielectric anisotropy, comprising
   a) one or more compounds of the formula I

I

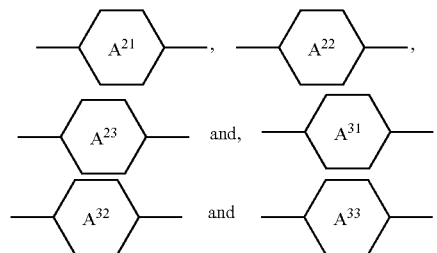

in which
$R^{11}$ and $R^{12}$ identically or differently, denote H, straight chain alkyl or alkoxy having 1 to 15 C atoms, straight chain alkenyl or alkenyloxy having 2 to 15 C atoms or branched alkyl, alkoxy, alkenyl, or alkenyloxy each having 3 to 15 C atoms, where one or more $CH_2$ groups in these radicals may each be replaced, independently of one another, by —CH=CH—, —C≡C—, —CF$_2$O—, —OCF$_2$—, —O—, —CO—O— or —O—CO— in such a way that O atoms are not linked directly to one another, and in which one or more H atoms may be replaced by halogen,

$L^{11}$ and $L^{12}$ independently denote H, F, Cl, $CH_3$, $CF_3$ or $CHF_2$;
preferably H or F, very preferably H;
and
   b) one or more compounds selected from the group of compounds of the formulae II and III

II $$R^2—\boxed{A^{23}}_l—\boxed{A^{22}}_m—\boxed{A^{21}}—CF_2O—\underset{Y^2\ \ L^{22}}{\overset{L^{21}}{\bigcirc}}—X^2$$

III $$R^3—\boxed{A^{33}}_n—\boxed{A^{32}}_o—\boxed{A^{31}}—Z^3—\underset{Y^3\ \ L^{32}}{\overset{L^{31}}{\bigcirc}}—X^3$$

in which
$R^2$ and $R^3$ have the meanings given above for $R^{11}$, preferably denote alkyl having 1 to 7 C atoms or alkenyl having 2 to 7 C atoms, independently of one another denote independently of one another denote $L^{21}$, $L^{22}$, $L^{31}$ and $L^{32}$ independently of each other, denote H or F,
$Y^2$ and $Y^3$ identically or differently, denote H or $CH_3$, preferably H, $X^2$ and $X^3$ independently of each other, denote halogen, halogenated alkyl or halogenated alkoxy with 1 to 3 C-atoms or halogenated alkenyl or halogenated alkenyloxy with 2 or 3 C-atoms, preferably F, Cl, $CF_3$, $OCF_3$ or $OCHF_2$, more preferably F or $OCF_3$, $Z^3$ denotes —$CH_2CH_2$—, —$CF_2CF_2$—, —COO—, trans-CH=CH—, trans-CF=CF—, —$CH_2O$— or a single bond, preferably a single bond, and l, m, n and o are, independently of each other, 0 or 1.

The combination of compounds of formula I with compounds of formula II and/or Ill, enables liquid-crystalline media that show a low rotational viscosity and a low value of the ratios of $\gamma_1/K_{22}$ and $\gamma_1/K_{11}$. This enables liquid-crystal displays, especially of the HB-FFS, FFS and IPS mode, with high brightness and transmission and fast response times. In addition, a higher average elastic constant ($K_{av}$) can be achieved while keeping all other relevant physical properties, which leads to a lower scattering parameter which improves the dark state of a display and therefore, improves the contrast.

In particular, the low-temperature stability (LTS) of the medium according to the invention is remarkably high. The medium is sufficiently stable at temperatures as low as –40° C. which is why the medium is particularly suitable for mobile applications, for example in automotive applications.

The liquid-crystalline media according to the invention are suitable for mobile applications and TFT applications, such as, for example, mobile telephones and PDAs. Furthermore, the liquid-crystalline media according to the invention are particularly suitably for use in FFS, HB-FFS and IPS displays based on dielectrically positive liquid crystals.

The liquid-crystal media according to the present invention are likewise suitable for use in liquid-crystal displays of the FFS, HB-FFS and IPS mode, based on dielectrically positive liquid crystals, and polymer stabilised variants thereof, for large size TV applications.

The invention further relates to the use of a liquid-crystalline medium as described above and below for electro-optical purposes, in particular for the use in liquid-crystal displays, shutter glasses, LC windows, 3D applications, preferably in TN, PS-TN, STN, TN-TFT, OCB, IPS, PS-IPS, FFS, HB-FFS, PS-HB-FFS, SA-HB-FFS, polymer stabilised SA-HB-FFS, positive VA and positive PS-VA displays, very preferably in FFS, HB-FFS, IPS, PS-HB-FFS and PS-IPS displays.

The invention further relates to an electro-optical liquid-crystal display containing a liquid-crystalline medium as described above and below, in particular a TN, PS-TN, STN, TN-TFT, OCB, IPS, PS-IPS, FFS, HB-FFS, PS-HB-FFS, SA-HB-FFS, polymer stabilised SA-HB-FFS, positive VA or positive PS-VA display, preferably a FFS, HB-FFS, IPS, PS-HB-FFS or PS-IPS display.

The invention further relates to a compound of the formula I (I)

in which $R^{11}$ and $R^{12}$ identically or differently, denote H, straight chain alkyl or alkoxy having 1 to 15 C atoms, straight chain alkenyl or alkenyloxy having 2 to 15 C atoms or branched alkyl, alkoxy, alkenyl, alkenyloxy each having 3 to 15 C atoms, where one or more $CH_2$ groups in these radicals may each be replaced, independently of one another, by —CH=CH—, —C≡C—, —$CF_2O$—, —$OCF_2$—, —O—, —CO—O— or —O—CO— in such a way that O atoms are not linked directly to one another, and in which one or more H atoms may be replaced by halogen, $L^{11}$ and $L^{12}$ denote H, F, Cl, $CH_3$, $CF_3$ or $CHF_2$, wherein $L^{11}$ and $L^{12}$ do not both denote H and if one of $L^{11}$ and $L^{12}$ denotes F the other of $L^{11}$ and $L^{12}$ is not Cl.

According to another aspect of the present invention there is provided a compound of the formula (3) defined below in scheme 1.

The compounds of the formula I can be synthesized in analogy to the synthesis of the structurally related chloro-fluoro derivatives shown in EP 1 897 928 A1.

A preferred synthetic pathway towards compounds of formula I is shown in scheme 1.

Scheme 1 in which X denotes Br or I and the other occurring groups have the meanings given above.

DETAILED DESCRIPTION OF THE INVENTION

Herein, an alkyl radical and/or an alkoxy radical is taken to mean straight-chain or branched or cyclic alkyl. It is preferably straight-chain, has 2, 3, 4, 5, 6 or 7 C atoms and accordingly preferably denotes ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy.

Herein, branched alkyl is preferably isopropyl, s-butyl, isobutyl, isopentyl, 2-methylbutyl, 2-methylhexyl or 2-ethylhexyl.

As used herein, cyclic alkyl is taken to mean straight-chain or branched alkyl or alkenyl having up to 12 C atoms, preferably alkyl having 1 to 7 C atoms, in which a group $CH_2$ is replaced with a carbocyclic ring having 3 to 5 C atoms, very preferably selected from the group consisting of cyclopropylalkyl, cyclobutylalkyl, cyclopentylalkyl and cyclopentenylalkyl, wherein alkyl is straight chain alkyl having 1 to 5 C atoms.

Herein, oxaalkyl preferably denotes straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, 2-, 3-, 4-, 5-, 6-, 7-, 8- or 9-oxadecyl.

Herein, alkenyl, i.e. an alkyl radical in which one $CH_2$ group has been replaced by —CH=CH—, may be straight-chain or branched. It is preferably straight-chain and has 2 to 10 C atoms. Accordingly, it denotes, in particular, vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, dec-1-, -2-, -3-, -4-, -5-, -6-, -7-, -8- or -9-enyl.

Herein, an alkyl or alkenyl radical which is at least monosubstituted by halogen, is preferably straight-chain, and halogen is preferably F or Cl. In the case of polysubstitution, halogen is preferably F. The resultant radicals also include perfluorinated radicals. In the case of mono-substitution, the fluorine or chlorine substituent may be in any desired position, but is preferably in the ω-position.

Herein, a mono- or polyfluorinated alkyl or alkoxy radical having 1, 2 or 3 C atoms or a mono- or polyfluorinated alkenyl radical having 2 or 3 C atoms is particularly preferably F, Cl, $CF_3$, $CHF_2$, $OCF_3$, $OCHF_2$, $OCFHCF_3$, $OCFHCHF_2$, $OCFHCHF_2$, $OCF_2CH_3$, $OCF_2CHF_2$, $OCF_2CHF_2$, $OCF_2CF_2CHF_2$, $OCF_2CF_2CHF_2$, $OCFHCF_2CF_3$, $OCFHCF_2CHF_2$, $OCF_2CF_2CF_3$, $OCF_2CF_2CClF_2$, $OCClFCF_2CF_3$, $OCH=CF_2$ or $CH=CF_2$, very particularly preferably F or $OCF_3$, furthermore $CF_3$, $OCF=CF_2$, $OCHF_2$ or $OCH=CF_2$.

The compounds of the formula I are preferably selected from the compounds of the formulae I-1 to I-4

I-1

I-2

-continued

I-3

I-4 in which $R^{11}$ and $R^{12}$ have the meanings defined above for formula I and preferably denote straight chain alkyl or alkoxy each having 1 to 7 C atoms, or straight chain alkenyl having 2 to 15 C atoms where one or more $CH_2$ groups in these radicals may each be replaced, independently of one another, by and very preferably denote straight chain alkyl having 1 to 7 C atoms or straight chain alkenyl having 1 to 7 C atoms.

More preferably the medium according to the invention comprises one or more compounds of the formula 1-1, very preferably selected from the compounds of the formulae I-1-1 to I-1-32

I-1-1

I-1-2

I-1-3

I-1-4

I-1-5

-continued

-continued

I-1-6

I-1-7

I-1-8

I-1-9

I-1-10

I-1-11

I-1-12

I-1-13

I-1-14

I-1-15

I-1-16

I-1-17

I-1-18

I-1-19

I-1-20

I-1-21

I-1-22

I-1-23

I-1-24

I-1-25

I-1-26

I-1-27

I-1-28

I-1-29

I-1-30

I-1-31

-continued

I-1-32 in which $R^{11}$ and $R^{12}$ denote straight chain alkyl having 1 to 7 C atoms or straight chain alkenyl having 2 to 7 C atoms.

The compounds of the formula 1-2 are preferably selected from the compounds of the formulae I-2-1 to I-2-32:

I-2-1

I-2-2

I-2-3

I-2-4

I-2-5

I-2-6

I-2-7

I-2-8

-continued

I-2-9

I-2-10

I-2-11

I-2-12

I-2-13

I-2-14

I-2-15

I-2-16

I-2-17

I-2-18

13
-continued
14
-continued
I-2-19
I-2-30
I-2-20
I-2-31
I-2-21
I-2-32
I-2-22
The compounds of the formula 1-3 are preferably selected from the compounds of the formulae I-3-1 to I-3-32:
I-2-23
I-3-1
I-2-24
I-3-2
I-2-25
I-3-3
I-2-26
I-3-4
I-2-27
I-3-5
I-2-28
I-2-29
I-3-6
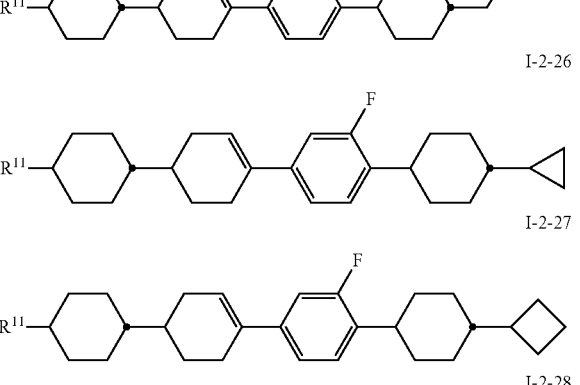

15

-continued

I-3-7

I-3-8

I-3-9

I-3-10

I-3-11

I-3-12

I-3-13

I-3-14

I-3-15

I-3-16

16

-continued

I-3-17

I-3-18

I-3-19

I-3-20

I-3-21

I-3-22

I-3-23

I-3-24

I-3-25

I-3-26

-continued

18
-continued

I-3-27

I-4-4

I-3-28

I-4-5

I-3-29

I-4-6

I-3-30

I-4-7

I-3-31

I-4-8

I-3-32

I-4-9

I-4-10

The compounds of the formula 1-4 are preferably selected from the compounds of the formulae I-4-1 to I-4-32:

I-4-11

I-4-1

I-4-12

I-4-2

I-4-3

I-4-13

-continued

-continued

I-4-14

I-4-15

I-4-16

I-4-17

I-4-18

I-4-19

I-4-20

I-4-21

I-4-22

I-4-23

I-4-24

I-4-25

I-4-26

I-4-27

I-4-28

I-4-29

I-4-30

I-4-31

I-4-32

Preferably, the medium comprises one or more compounds of formula II, preferably selected from the group of compounds of formulae II-1 to 11-3, very preferably from the group of compounds of the formulae II-1 and II-3

II-1

II-2

II-3 in which the occurring groups have the respective meanings given under formula II above and in formula II-1 the radicals $L^{23}$ and $L^{24}$ denote, independently of each other, H or F and in formula II-2 preferably independently of each other, denote In formulae II-1, II-2 and II-3, $L^{21}$ and $L^{22}$ or $L^{23}$ and $L^{24}$ are preferably both F.

In another preferred embodiment in formulae II-1 and II-2, all of $L^{21}$, $L^{22}$, $L^{23}$ and $L^{24}$ denote F.

The compounds of formula II-1 are preferably selected from the group of compounds of the formulae II-1a to II-1h II-1a II-1b II-1c II-1d II-1e II-1f II-1g II-1h in which the occurring groups have the respective meanings given above.

In a preferred embodiment of the present invention the medium comprises one or more compounds selected from the group of compounds of the formulae II-1a to II-1 h wherein $L^{21}$ and $L^{22}$, and/or $L^{23}$ and $L^{24}$ are both F, respectively.

In another preferred embodiment the medium comprises compounds selected from the group of compounds of formulae II-1a to II-1h, wherein $L^{21}$, $L^{22}$, $L^{23}$ and $L^{24}$ all are F.

Especially preferred compounds of formula II-1 are

II-1a-1

-continued

II-1f-1

II-1g-1

II-1h-1 in which $R^2$ has the meaning given above.

Preferably the compounds of formula II-2 are selected from the group of compounds of formulae II-2a to II-2c II-2a II-2b II-2c in which the occurring groups have the respective meanings given above and preferably $L^{21}$ and $L^{22}$ are both F.

Preferably the compounds of formula II-3 are selected from the group of compounds of formulae II-3a to II-3e II-3a -continued II-3b II-3c II-3d II-3e in which the occurring groups have the respective meanings given above and preferably $L^{21}$ and $L^{22}$ are both F and $L^{23}$ and $L^{24}$ are both H or $L^{21}$, $L^{22}$, $L^{23}$ and $L^{24}$ are all F.

Especially preferred compounds of formula II-3 are

II-3a-1

II-3a-2

II-3b-1

-continued

II-3d-1

II-3e-1 in which $R^2$ has the meaning given above.

In addition to the preferred compounds of formula II above the medium optionally comprises one or more compounds of formula II selected from the compounds of the formulae IIA1 to IIA7:

IIA1

IIA2

IIA3

IIA4

IIA5

-continued

IIA6

IIA7 in which $R^2$ and $X^2$ have the meanings given in formula II or one of the preferred meanings given above and below.

Preferred compounds are those of formula IIA1, IIA2 and IIA3, very preferred those of formula IIA1 and IIA2.

In the compounds of formulae IIA1 to IIA7, $R^2$ preferably denotes alkyl having 1 to 6 C atoms, very preferably ethyl or n-propyl, and $X^2$ preferably denotes F or $OCF_3$, very preferably F.

In another preferred embodiment of the present invention the medium comprises one or more compounds of formula III preferably selected from the group of formulae III-1 and III-2, preferably of formula III-2:

III-1

III-2 in which the occurring groups and parameters have the respective meanings given under formula III above.

$R^3$ preferably denotes alkyl having 1 to 7 C atoms or alkenyl having 2 to 7 C atoms.

Preferably the compounds of formula III-1 are selected from the group of compounds of formulae III-1a and III-1b III-1a

27

-continued

III-1b in which the occurring groups have the respective meanings given above and $L^{33}$ and $L^{34}$, independently of each other, denote H or F.

The compounds of formula III-1a are preferably selected from the group of compounds of formulae III-1a-1 to III-1a-6

III-1a-1

III-1a-2

III-1a-3

III-1a-4

III-1a-5

III-1a-6 in which $R^3$ has the meaning given above.

Preferably the compounds of formula III-2 are selected from the group of compounds of formulae III-2a to III-2m III-2a III-2b III-2c III-2d III-2e III-2f III-2g III-2h -continued III-2i $R^3$ ... $L^{33}$ $L^{31}$ $L^{34}$ $L^{32}$ $X^3$ III-2j $R^3$ ... $L^{33}$ $L^{31}$ $L^{34}$ $L^{32}$ $X^3$ III-2k $R^3$ ... $L^{33}$ $L^{31}$ $L^{34}$ $L^{32}$ $X^3$ III-2l $R^3$ ... O ... O ... $L^{33}$ $L^{31}$ $L^{34}$ $L^{32}$ $X^3$ III-2m $R^3$ ... $L^{33}$ $L^{31}$ $L^{34}$ $L^{32}$ $X^3$ in which the occurring groups have the respective meanings given above and $L^{35}$ and $L^{36}$, independently of one another, denote H or F.

Preferably, the compounds of formula II-2a are selected from the group of compounds of formulae III-2a-1 to III-2a-4

III-2a-1

$R^3$ ... F

III-2a-2

$R^3$ ... F F

-continued

III-2a-3

$R^3$ ... F F F

III-2a-4

$R^3$ ... Cl in which $R^3$ has the meaning given above.

The compounds of formula III-2b are preferably selected from the group of compounds of formulae III-2b-1 and III-2b-2, preferably III-2b-2

III-2b-1

$R^3$ ... F F

III-2b-2

$R^3$ ... F Cl in which $R^3$ has the meaning given above.

The compounds of formula II-2c, are preferably selected from the group of compounds of formulae III-2c-1 to III-2c-5

III-2c-1

$R^3$ ... $OCF_3$

III-2c-2

$R^3$ ... F $OCF_3$

III-2c-3

$R^3$ ... F F

III-2c-4

$R^3$ ... F F F

III-2c-5

$R^3$ ... Cl in which $R^3$ has the meaning given above.

The compounds of formulae III-2d and III-2e are preferably selected from the group of compounds of formulae III-2d-1 and III-2e-1

III-2g-1

III-2d-1

III-2e-1 in which $R^3$ has the meaning given above.

The compounds of formula III-2f are preferably selected from the group of compounds of formulae III-2f-1 to III-2f-7

III-2g-2

III-2g-3

III-2g-4

III-2f-1

III-2g-5

III-2f-2

III-2f-3

III-2g-6

III-2f-4

III-2f-5

III-2g-7 in which $R^3$ has the meaning given above.

The compounds of formula III-2h are preferably selected from the group of compounds of formulae III-2h-1 to III-2h-5

III-2f-6

III-2f-7

III-2h-1 in which $R^3$ has the meaning given above.

The compounds of formula III-2g are preferably selected from the group of compounds of formulae III-2g-1 to III-2g-7

III-2h-2

-continued

-continued

III-2h-3

III-2j-2

III-2h-4

III-2j-3

III-2h-5 in which R$^3$ has the meaning given above.

The compounds of formula III-2k are preferably selected from the group of compounds of formulae III-2k-1 to III-2k-6 in which R$^3$ has the meaning given above.

III-2k-1

The compounds of formula III-2i are preferably selected from the group of compounds of formulae III-2i-1 to III-2i-3

III-2k-2

III-2i-1

III-2k-3

III-2i-2

III-2i-3

III-2k-4

50 in which R$^3$ has the meaning given above.

III-2k-5

The compounds of formula III-2j are preferably selected from the group of compounds of formulae III-2j-1 to III-2j-3

III-2k-6

III-2j-1

in which R$^3$ has the meaning given above.

The compounds of formula III-2l are preferably selected from the group of compounds of formulae III-2l-1 to III-2l-6

III-2l-1

III-2l-2

III-2l-3

III-2l-4

III-2l-5

III-2l-6 in which $R^3$ has the meaning given above.

The compounds of formula III-2m are preferably selected from the compounds of formula III-2m-1

III-2m-1

Alternatively, or in addition to the compounds of the formulae III-1 and/or III-2 the media according to the present invention optionally comprise one or more compounds of formula III-3,

III-3 in which the groups and parameters have the respective meanings given under formula III above, preferably of formula III-3a III-3a in which the $R^3$ has the meaning given above.

In addition to the preferred compounds of formula III above the medium optionally comprises one or more compounds selected from the group consisting of the formulae IIIA-1 to IIIA-21:

IIIA1

IIIA2

IIIA3

IIIA4

-continued

IIIA5

-continued

IIIA14

IIIA6

IIIA15

IIIA7

IIIA16

IIIA8

IIIA17

IIIA9

IIIA18

IIIA10

IIIA19

IIIA11

IIIA20

IIIA12

IIIA21

IIIA13 in which $R^3$ and $X^3$ have the meanings given in formula III or one of the preferred meanings given above and below. Preferred compounds are those of formula IIIA1, IIIA4, IIIA6, IIIA16, IIIA19 and IIIA20.

In the compounds of formulae IIIA1 to IIIA21 $R^3$ preferably denotes alkyl having 1 to 6 C atoms, very preferably ethyl or propyl, $X^3$ preferably denotes F or $OCF_3$, very preferably F.

Preferably, the medium according to the invention comprises one or more compounds of the formula IV

IV $$R^{11}—\bigcirc—\bigcirc—R^{12}$$

in which

R$^{11}$ denotes a straight chain alkyl radical having 1 to 12 C atoms or a branched or cyclic alkyl radical having 3 to 12 C atoms, or a straight chain alkenyl radical having 2 to 12 C atoms or a branched alkenyl radical having 3 to 12 C atoms or a cyclic alkenyl radical having 5 to 12 C atoms, wherein one or more H atoms are optionally replaced by fluorine, preferably a straight chain alkyl radical having 1 to 12 C atoms, very preferably having 1 to 7 C atoms, R$^{12}$ denotes a straight chain alkyl or alkoxy radical having 1 to 12 C atoms or a branched or cyclic alkyl or alkoxy radical having 3 to 12 C atoms, or a straight chain alkenyl radical having 2 to 12 C atoms or a branched alkenyl radical having 3 to 12 C atoms or a cyclic alkenyl radical having 5 to 12 C atoms, wherein one or more H atoms are optionally replaced by fluorine, preferably a straight chain alkenyl radical having 2 to 12 C atoms, very preferably having 2 to 7 C atoms.

The compounds of the formula IV are preferably selected from the group of the compounds of the formulae IV-1 to IV-4, very preferably of the formula IV-3

IV-1 alkyl—$\bigcirc$—$\bigcirc$—alkyl'

IV-2 alkyl—$\bigcirc$—$\bigcirc$—alkoxy

IV-3 alkyl—$\bigcirc$—$\bigcirc$—alkenyl

IV-4 alkenyl—$\bigcirc$—$\bigcirc$—alkenyl' in which alkyl and alkyl', independently of one another, denote alkyl having 1 to 7 C atoms, preferably having 2 to 5 C atoms, alkoxy denotes alkoxy having 1 to 5 C atoms, preferably having 2 to 4 C atoms, alkenyl denotes an alkenyl radical having 2 to 5 C atoms, preferably having 2 to 4 C atoms, particularly preferably 2 C atoms, and alkenyl' denotes an alkenyl radical having 2 to 5 C atoms, preferably having 2 to 4 C atoms, particularly preferably having 2 to 3 C atoms.

Preferably, the medium comprises one or more compounds of formula IV-1, preferably selected from the compounds of the formulae IV-1-1 to IV-1-6

IV-1-1

H$_3$C—$\bigcirc$—$\bigcirc$—C$_3$H$_7$

IV-1-2

C$_2$H$_5$—$\bigcirc$—$\bigcirc$—C$_3$H$_7$

IV-1-3

C$_2$H$_5$—$\bigcirc$—$\bigcirc$—C$_4$H$_9$

IV-1-4

C$_2$H$_5$—$\bigcirc$—$\bigcirc$—C$_5$H$_{11}$

IV-1-5

C$_3$H$_7$—$\bigcirc$—$\bigcirc$—C$_4$H$_9$

IV-1-6

C$_3$H$_7$—$\bigcirc$—$\bigcirc$—C$_5$H$_{11}$

Preferably, the medium according to the invention comprises one or more compounds of the formulae IV-2-1 and/or IV-2-2

IV-2-1

C$_3$H$_9$—$\bigcirc$—$\bigcirc$—OCH$_3$

IV-2-2

C$_3$H$_9$—$\bigcirc$—$\bigcirc$—OC$_3$H$_9$

Preferably, the medium according to the invention comprises a compound of formula IV-3, very preferably selected from the compounds of the formulae IV-3-1 to IV-3-6, in particular the compound of formula IV-3-2 and/or IV-3-6:

IV-3-1

IV-3-2

IV-3-3

IV-3-4

41

-continued

IV-3-5

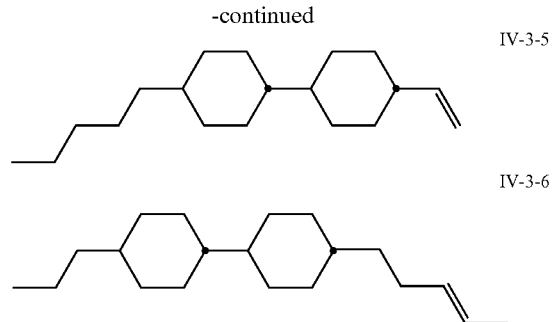

IV-3-6

Preferably, the medium according to the invention comprises a compound of formula IV-4, in particular selected from the compounds of the formulae IV-4-1 and IV-4-2:

IV-4-1

IV-4-2

Preferably, the medium according to the invention comprises one or more compounds of the formula IVa and/or IVb, very preferably IVb IVa R⁴¹—⟨ring⟩—Z⁴—⟨A⟩—R⁴²

IVb

R⁴¹—⟨ring⟩—⟨ring⟩—R⁴² in which

R⁴¹ and R⁴² each, independently of one another, denote a straight-chain alkyl, alkoxy, alkenyl, alkoxyalkyl or alkenyloxy radical having up to 12 C atoms, and

⟨A⟩ denotes, (ring structures) , , , or

42

-continued (structure with O)

, $Z^4$ denotes a single bond, $—CH_2CH_2—$, $—CH=CH—$, $—CF_2O—$, $—OCF_2—$, $—CH_2O—$, $—OCH_2—$, $—COO—$, $—OCO—$, $—C_2F_4—$, $—C_4H_8—$, or $—CF=CF—$.

Preferred compounds of the formula IVa are selected from the compounds of the formulae IVa-1 to IVa-4:

IVa-1 alkyl—⟨ring⟩—⟨ring⟩—alkyl*

IVa-2 alkyl—⟨ring⟩—⟨ring⟩—O-alkyl*

IVa-3 alkyl—⟨ring⟩—⟨ring⟩—alkyl*

IVa-4 alkyl—⟨ring⟩—⟨ring⟩—alkyl* in which alkyl and alkyl* each, independently of one another, denote a straight-chain alkyl radical having 1 to 6 C atoms.

The medium according to the invention preferably comprises at least one compound of the formula IVa-2.

Preferred compounds of the formula IVb are selected from the compounds of the formulae IVb-1 to IVb-3:

IVb-1 alkyl—⟨ring⟩—⟨ring⟩—alkyl*

IVb-2 alkyl—⟨ring⟩—⟨ring⟩—alkenyl*

IVb-3 alkenyl—⟨ring⟩—⟨ring⟩—alkenyl* in which alkyl and alkyl* each, independently of one another, denote a straight-chain alkyl radical having 1 to 6 C atoms, and alkenyl and alkenyl* each, independently of one another, denote a straight-chain alkenyl radical having 2 to 6 C atoms.

Of the compounds of the formulae IVb-1 to IVb-3, the compounds of the formula IVb-2 are particularly preferred.

Very particularly preferred compounds of the formulae IVb are selected from the following compounds:

IVb-1-1 n = 1, 2 or 3

IVb-2-1

IVb-2-2

IVb-2-3

IVb-2-4

The medium according to the invention particularly preferably comprises the compound IVb-2-3.

In a preferred embodiment, the medium according to the invention comprises one or more compounds of formula V

V in which $R^{51}$, $R^{52}$ denote alkyl having 1 to 7 C atoms, alkoxy having 1 to 7 C atoms, or alkoxyalkyl, alkenyl or alkenyloxy having 2 to 7 C atoms, and identically or differently, denote or $Z^{51}$, $Z^{52}$ each, independently of one another, denote $-CH_2-CH_2-$, $-CH_2-O-$, $-CH=CH-$, $-C\equiv C-$, $-COO-$ or a single bond, and n is 1 or 2, where the compounds of the formulae I and CL are excluded.

The compounds of formula V are preferably selected from the compounds of the formulae V-1, V-2, V-3 and V-4:

V-1

V-2

V-3

V-4 in which the groups occurring have the meanings given above for formula V.

The compounds of formula V-1 are preferably selected from the compounds of the formulae V-1-1 to V-1-8;

the compounds of formula V-2 are preferably selected from the compounds of the formulae V-2-1 to V-2-4; and the compounds of formula V-3 are preferably selected from the compounds of the formulae V-3-1 to V-3-4:

V-1-1

V-1-2

V-1-3

V-1-4

V-1-5

-continued

V-1-6

V-1-7

V-1-8

V-2-1

V-2-2

V-2-3

V-2-4

V-3-1

V-3-2

V-3-3

V-3-4

V-4-1 in which R$^{51}$ and R$^{52}$ have the meanings indicated for formula V above.

R$^{51}$ and R$^{52}$ preferably each, independently of one another, denote straight-chain alkyl having 1 to 7 C atoms or alkenyl having 2 to 7 C atoms.

Very preferred compounds of the formula V-2-1 are selected from the compounds of the formulae V-2-1a to V-2-g V-2-1a V-2-1b V-2-1c V-2-1d V-2-1e V-2-1f V-2-1g Very preferred compounds of the formula V-2-2 are selected from the compounds of the formulae V-2-2a to V-2-2i V-2-2a V-2-2b V-2-2c -continued V-2-2d V-2-2e V-2-2f V-2-2g V-2-2h V-2-2i Preferably, the medium according to the invention comprises one or more compounds of the formula CL

CL in which $R^L$ denotes H, a straight chain or branched alkyl or alkoxy radical having 1 to 15 C atoms, or a straight chain or branched alkenyl radical having 2 to 15 C atoms, where one or more $CH_2$ groups in these radicals may each be replaced, independently of one another, by $-C\equiv C-$, $-CF_2O-$, $-OCF_2-$, $-CH=CH-$, $-O-$, $-CO-O-$ or $-O-CO-$ in such a way that O atoms are not linked directly to one another, and in which, in addition, one or more H atoms may be replaced by halogen, $X^L$ denotes F, Cl, CN, $CHF_2$, $CF_3$, $OCF_3$, or, identically or differently, has one of the meanings of $R^L$, $Y^L$ denotes H, F, C or $CH_3$.

The compounds of formula CL are preferably selected form the group of compounds of the formulae CL-1, CL-2 and CL-3:

CL-1

CL-2

CL-3 in which $R^{L1}$ and $R^{L2}$, identically or differently, have the meanings given above for formula I and, preferably denote alkyl or alkenyl having 1 to 7 C atoms or 2 to 7 C atoms, respectively, in which a $CH_2$ group may be replaced by cyclopropane-1,2-diyl, and $R^{L2}$ alternatively denotes alkoxy having 1 to 5 C atoms.

Very preferred compounds of the formula CL are selected from the compounds of the formulae CL-3-1 to CL-3-12:

CL-3-1

CL-3-2

CL-3-3

CL-3-4

CL-3-5

CL-3-6

CL-3-7

CL-3-8

-continued

CL-3-9

CL-3-10

CL-3-11

CL-3-12

In a particularly preferred embodiment, the medium according to the invention comprises the compound CL-3-1 or CLP-3-3.

In a preferred embodiment of the present invention the medium additionally comprises one or more compounds of the formulae VI-1 to VI-9

VI-1

VI-2

VI-3

VI-4

VI-5

-continued

VI-6

VI-7

VI-8

VI-9 in which $R^6$ each, independently of one another, denote a straight-chain or branched alkyl or alkoxy radical that is unsubstituted or halogenated and has 1 to 15 C atoms, where one or more $CH_2$ groups in these radicals may each be replaced, independently of one another, by —C≡C—, —CF$_2$O—, —CH=CH—, —O—, —CO—O— or —O—CO— in such a way that O atoms are not linked directly to one another, $A^{21}$, $A^{22}$, $A^{23}$, $A^{31}$ $A^{32}$ and $A^{33}$, independently of one another denote -continued w each, independently of one another, denote an integer from 1 to 6.

In a preferred embodiment of the present invention the medium additionally comprises one or more compounds of the formula VII,

VII in which

R$^{71}$ and R$^{72}$ denote H, F, straight chain alkyl or alkoxy having 1 to 15 C atoms, straight chain alkenyl or alkenyloxy having 2 to 15 C atoms or branched alkyl, alkoxy, alkenyl, alkenyloxy each having 3 to 15 C atoms, where one or more CH$_2$ groups in these radicals may each be replaced, independently of one another, by —C≡C—, —CF$_2$O—, —OCF$_2$—, —CH═CH—, —O—, —CO—O— or —O—CO— in such a way that O atoms are not linked directly to one another, and in which one or more H atoms may be replaced by halogen, X$^{71}$ to X$^{76}$, identically or differently, denote H or F, preferably at least one of X$^{71}$ to X$^{76}$ denotes F, more preferably at least two of X$^{71}$ to X$^{76}$ denote F;

Z$^{71}$ and Z$^{72}$, identically or differently, denote CH$_2$CH$_2$ or a single bond.

The compounds of the formula VII are preferably selected from the formulae VII-1 and VII-2:

VII-1

VII-2 in which the occurring groups have the meanings given for formula VII.

The compounds of the formula VII-1 are preferably selected from the formulae VII-1-1 to VII-1-21, very preferably of the formula VII-1-4:

VII-1-1

VII-1-2

VII-1-3

VII-1-4

VII-1-5

53

-continued

VII-1-6

R$^7$—(O)C$_m$H$_{2m+1}$

VII-1-7

R$^7$—(O)C$_m$H$_{2m+1}$

VII-1-8

R$^7$—(O)C$_m$H$_{2m+1}$

VII-1-9

R$^7$—(O)C$_m$H$_{2m+1}$

VII-1-10

R$^7$—(O)C$_m$H$_{2m+1}$

VII-1-11

R$^7$—(O)C$_m$H$_{2m+1}$

VII-1-12

R$^7$—(O)C$_m$H$_{2m+1}$

VII-1-13

R$^7$—(O)C$_m$H$_{2m+1}$

VII-1-14

R$^7$—(O)C$_m$H$_{2m+1}$

VII-1-15

R$^7$—(O)C$_m$H$_{2m+1}$

54

-continued

VII-1-16

R$^7$—(O)C$_m$H$_{2m+1}$

VII-1-17

R$^7$—(O)C$_m$H$_{2m+1}$

VII-1-18

R$^7$—(O)C$_m$H$_{2m+1}$

VII-1-19

R$^7$—(O)C$_m$H$_{2m+1}$

VII-1-20

R$^7$—C$_m$H$_{2m+1}$

VII-1-21

R$^7$—C$_n$H$_{2n}$—C$_m$H$_{2m+1}$ in which R$^7$ denotes a straight-chain alkyl or alkoxy radical having 1 to 6 C atoms, (O) denotes —O— or a single bond, and m is 0, 1, 2, 3, 4, 5 or 6 and n is 0, 1, 2, 3 or 4. R$^7$ preferably denotes methyl, ethyl, propyl, butyl, pentyl, hexyl, methoxy, ethoxy, propoxy, butoxy, pentoxy.

In the compounds of the formula VII-1-4, (O) preferably denotes —O—.

The compounds of the formula VII-2 are preferably selected from the formulae VII-2-1 to VII-2-15, very preferably of the formula VII-2-1:

VII-2-1

R$^7$—(O)C$_m$H$_{2m+1}$

-continued

VII-2-2

VII-2-3

VII-2-4

VII-2-5

VII-2-6

VII-2-7

VII-2-8

VII-2-9

-continued

VII-2-10

VII-2-11

VII-2-12

VII-2-13

VII-2-14

VII-2-15 in which $R^7$ denotes a straight-chain alkyl or alkoxy radical having 1 to 6 C atoms, (O) denotes —O— or a single bond, and m is 0, 1, 2, 3, 4, 5 or 6 and n is 0, 1, 2, 3 or 4. $R^7$ preferably denotes methyl, ethyl, propyl, butyl, pentyl, hexyl, methoxy, ethoxy, propoxy, butoxy, pentoxy.

Preferably, the medium according to the invention comprises one or more compounds of the formula VIII:

VIII in which $R^{81}$ and $R^{82}$, identically or differently, denote H, halogen, CN, SCN, straight chain alkyl or alkoxy having 1 to 15 C atoms, straight chain alkenyl or alkenyloxy having 2 to 15 C atoms or branched alkyl, alkoxy, alkenyl or alkenyloxy having 3 to 15 C atoms, where one or more CH$_2$ groups in these radicals may each be replaced, independently of one another, by —C≡C—, —CF$_2$O—, —OCF$_2$—, —CH=CH—, by —O—, —CO—O— or —O—CO— in such a way that O atoms are not linked directly to one another, and in which one or more H atoms may be replaced by halogen, A$^0$, A$^{81}$, and A$^{82}$, each, independently of one another, denote phenylene-1,4-diyl, in which one or two CH groups may be replaced by N and one or more H atoms may be replaced by halogen, CN, CH$_3$, CHF$_2$, CH$_2$F, CF$_3$, OCH$_3$, OCHF$_2$ or OCF$_3$, cyclohexane-1,4-diyl, in which one or two non-adjacent CH$_2$ groups may be replaced, independently of one another, by 0 and/or S and one or more H atoms may be replaced by F, cyclohexene-1,4-diyl, bicyclo[1.1.1]pentane-1,3-diyl, bicyclo[2.2.2]octane-1,4-diyl, spiro[3.3]heptane-2,6-diyl, tetrahydropyran-2,5-diyl or 1,3-dioxane-2,5-diyl;

Z$^{81}$ and Z$^{82}$, each, independently of one another, denote —CF$_2$O—, —OCF$_2$—, —CH$_2$O—, —OCH$_2$—, —CO—O—, —O—CO—, —C$_2$H$_4$—, —C$_2$F$_4$—, —CF$_2$CH$_2$—, —CH$_2$CF$_2$—, —CFHCFH—, —CFHCH$_2$—, —CH$_2$CFH—, —CF$_2$CFH—, —CFHCF$_2$—, —CH=CH—, —CF=CH—, —CH=CF—, —CF=CF—, —C≡C— or a single bond;

n denotes 0, 1, 2 or 3, preferably 0, 1 or 2, very preferably 0 or 1, particularly preferably 0; and m denotes 0, 1, 2 or 3, preferably 0, 1 or 2, very preferably 1 or 2, in particular 1.

where the compounds of the formula I are excluded from formula VIII.

A$^{81}$ and A$^{82}$ in formula I preferably denote phenylene-1,4-diyl, which may also be mono- or polysubstituted by F, furthermore cyclohexane-1,4-diyl, cyclohexenylene-1,4-diyl, tetrahydropyran-2,5-diyl or 1,3-dioxane-2,5-diyl, very preferably phenylene-1,4-diyl which may also be mono- or polysubstituted by F, or cyclohexane-1,4-diyl.

Z$^{81}$ and Z$^{82}$ in formula I preferably denote —CF$_2$O—, —OCF$_2$— or a single bond, very preferably a single bond.

A$^{81}$ and A$^{82}$ in formula I particularly preferably denote

-continued in which L denotes halogen, CF$_3$ or CN, preferably F.

Preference is furthermore given to compounds of the formula VIII in which R$^{81}$ and R$^{82}$ each, independently of one another, denote H, F, or alkyl, alkoxy, alkenyl or alkynyl having 1 to 8, preferably 1 to 5, C atoms, each of which is optionally substituted by halogen, in particular by F.

R$^{81}$ and R$^{82}$ preferably denote H, optionally fluorinated alkyl or alkoxy having 1 to 7 C atoms, optionally fluorinated alkenyl or alkynyl having 2 to 7 C atoms, optionally fluorinated cycloalkyl having 3 to 12 C atoms.

Preferably, at least one of R$^{81}$ and R$^{82}$ is not H, particularly preferably both of R$^{81}$ and R$^{82}$ are not H. R$^{81}$ is very particularly preferably alkyl. R$^{82}$ is furthermore preferably H, alkyl or fluorine. Very particularly preferably, R$^{81}$ is alkyl and R$^{82}$ is H or alkyl. R$^{81}$. R$^{82}$ each, independently of one another, very particularly preferably denote unbranched alkyl having 1 to 5 C atoms. If R$^{81}$ and R$^{82}$ denote substituted alkyl, alkoxy, alkenyl or alkynyl, the total number of C atoms in the two groups R$^{81}$ and R$^{82}$ is preferably less than 10.

Preferred compounds of the formula VIII are selected from the following sub-formulae, more preferably from the compounds of the formula VIII-3:

VIII-1

VIII-2

VIII-3

VIII-4

VIII-5

-continued

VIII-6

in which $R^{81}$ and $R^{82}$ have the meanings indicated above, L denotes F, and r, s and t independently are 0, 1, 2, 3, or 4. r preferably is 1 or 2, very preferably 2 and s and t independently are preferably 0 or 1, very preferably 0. $R^{81}$ and $R^{82}$ in particular independently denote n-alkyl having 1 to 5 C atoms.

In a first very preferred embodiment, the compounds of the formulae VIII-1 to VIII-6 are selected from the compounds of the formula VIII-1a to VIII-6a, in particular of the formula VIII-3a:

VIII-1a

VIII-2a

VIII-3a

VIII-4a

VIII-5a

-continued

VIII-6a in which $R^{81}$, $R^{82}$, L, r and s have the meanings defined above.

In a second very preferred embodiment, the compounds of the formulae VIII-1 to VIII-6 are selected from the compounds of the formula VIII-1b to VIII-5b, in particular of the formula VIII-2b:

VIII-1b

VIII-2b

VIII-3b

VIII-4b

VIII-5b in which $R^1$, $R^2$, L, r and s have the meanings defined above.

In a third very preferred embodiment, the compounds of the formulae VIII-1 to VIII-6 are selected from the compounds of the formula VIII-1c to VIII-6c, in particular of the formula I3-c:

VIII-1c

-continued

VIII-2c

VIII-3c

VIII-4c

VIII-5c

VIII-6c in which $R^1$, $R^2$, L, r and s have the meanings defined above.

In a fourth very preferred embodiment, the compounds of the formulae VIII-1 to VIII-6 are selected from the compounds of the formula VIII-1d to VIII-6d, in particular of the formula VIII-3d:

VIII-1d

VIII-2d

VIII-3d

-continued

VIII-4d

VIII-5d

VIII-6d in which $R^1$, $R^2$, L, r and s have the meanings defined above.

In a particularly preferred embodiment, the medium according to the invention comprises one or more compounds selected from the group of the formulae VIII-1a to VIII-6a and one or more compounds selected from the group of the formulae VIII-1b to VIII-6b.

Very particularly preferably the medium comprises one or more compounds selected from the group of compounds of the formulae VIII-3a, VIII-2b, VIII-3c and VIII-3d:

VIII-3a

VIII-2b

VIII-3c

VIII-3d in which $R^{81}$, $R^{82}$, L and r have the meanings defined above and preferably r is 0.

Most preferred compounds of formula VIII include, in particular, one or more of the following:

VIII-3a-1

VIII-3a-2

VIII-3a-3

VIII-3a-4

VIII-3a-5

VIII-3a-6

VIII-2b-1

VIII-2b-2

64

-continued

VIII-2b-3

VIII-2b-4

VIII-2b-5

VIII-2b-6

VIII-2c-1

VIII-2c-2

VIII-2c-3

VIII-2c-4

VIII-2c-5

VIII-2c-6

Alternatively, or additionally, the following compounds of formula VIII can be used:

66

VIII-3a-7

VIII-3a-14

VIII-3a-8

VIII-3a-15

VIII-3a-9

VIII-2b-7

VIII-3a-10

VIII-2b-8

VIII-3a-11

VIII-2b-9

VIII-3a-12

VIII-2b-10

VIII-2b-11

VIII-3a-13

VIII-2b-12

VIII-2b-13

-continued

VIII-2b-14

VIII-3c-7

VIII-3c-8

VIII-3c-9

VIII-3c-10

VIII-3c-11

VIII-3c-12

VIII-3c-13

VIII-3c-14

The medium according to the invention optionally comprises one or more compounds with negative dielectric anisotropy, preferably selected from the group consisting of the formulae Y, B, BC, CR, PH-1 and PH-2:

Y

B

BC

CR

PH-1

PH-2 in which
$R^{Y1}$, $R^{Y2}$, $R^{B1}$, $R^{B2}$, $R^{CR1}$, $R^{CR2}$, $R^{P1}$, and $R^{P2}$ each, independently of one another,
denote H, an alkyl or alkoxy radical having 1 to 15 C atoms, where one or more $CH_2$ groups in these radicals may each be replaced, independently of one another, by —CH=CH—, —C≡C—, —CF$_2$O—, —OCF$_2$—, —O—, —CO—O— or —O—CO— in such a way that O atoms are not linked directly to one another, and in which one or more H atoms may be replaced by halogen, on each occurrence, independently of one another, denote a) 1,4-cyclohexenylene or 1,4-cyclohexylene radical, in which one or two non-adjacent $CH_2$ groups may be replaced by —O— or —S—, b) a 1,4-phenylene radical, in which one or two CH groups may be replaced by N, or c) a radical from the group spiro[3.3]heptane-2,6-diyl, 1,4-bicyclo-[2.2.2]octylene, naphthalene-2,6-diyl, decahydronaphthalene-2,6-diyl, 1,2,3,4-tetrahydronaphthalene-2,6-diyl, phenanthrene-2,7-diyl and fluorene-2,7-diyl, where the radicals a), b) and c) may be mono- or polysubstituted by halogen atoms, preferably $Z^x$, $Z^y$ identically or differently denote  —$CH_2CH_2$—,  —CH=CH—,  —$CF_2O$—, —$OCF_2$—, —$CH_2O$—, —$OCH_2$—, —CO—O—, —O—CO—,  —$C_2F_4$—,  —CF=CF—, —CH=CH—$CH_2O$—, or a single bond, preferably a single bond, $Z^1$ on each occurrence independently of one another denotes  —CO—O—,  —O—CO—,  —$CF_2O$—, —$OCF_2$—,  —$CH_2O$—,  —$OCH_2$—,  —$CH_2$—, —$CH_2CH_2$—, —$(CH_2)_4$—, —CH=CH—$CH_2O$—, —$C_2F_4$—, —$CH_2CF_2$—, —$CF_2CH_2$—, —CF=CF—, —CH=CF—,   —CF=CH—,   —CH=CH—, —C≡C— or a single bond, preferably $CH_2O$ or a single bond, and $L^{Y1}$, $L^{Y2}$, $L^{B1}$ and $L^{B2}$ each, independently of one another, denote F, Cl, $CF_3$ or $CHF_2$, preferably H or F, most preferably F, and W denotes O or S, n is 0, 1 or 2, preferably 0 or 1, c is 0, 1 or 2, preferably 1 or 2, x and y independently are 0, 1 or 2, where x+y≤3.

The compounds of the formula Y are preferably selected from the group of compounds of the formulae YA, YB, YC and YD:

in which $R^{2A}$, $R^{2B}$, $R^{2C}$ and $R^{2D}$ each, independently of one another, denote H, an alkyl or alkenyl radical having up to 15 C atoms which is unsubstituted, monosubstituted by CN or $CF_3$ or at least monosubstituted by halogen, where, in addition, one or more $CH_2$ groups in these radicals may be replaced by —O—, —S—, —C≡C—, —$CF_2O$—, —$OCF_2$—, —OC—O— or —O— CO— in such a way that O atoms are not linked directly to one another, $L^1$ to $L^4$ each, independently of one another, denote F, Cl, $CF_3$ or $CHF_2$, Y denotes H, F, Cl, $CF_3$, $CHF_2$ or $CH_3$, preferably H or $CH_3$, very preferably H, $Z^2$, $Z^{2B}$ and $Z^{2D}$ each, independently of one another, denote a single bond, —$CH_2CH_2$—, —CH=CH—, —$CF_2O$—,   —$OCF_2$—,   —$CH_2O$—,   —$OCH_2$—, —COO—, —OCO—, —$C_2F_4$—, —CF=CF— or —CH=CH—$CH_2O$—, (O) denotes O or a single bond, p denotes 0, 1 or 2,

q denotes 0 or 1, and v denotes 1, 2, 3, 4, 5, or 6.

Preferred compounds of the formulae YA, YB, YC and YD are indicated below:

YA-1 alkyl—[cyclohexyl]—[phenyl(F,F)]—alkyl*

YA-2 alkyl—[cyclohexyl]—[phenyl(F,F)]—O-alkyl*

YA-3 alkyl—[cyclohexyl]—[phenyl(Cl,F)]—alkyl*

YA-4 alkyl—[cyclohexyl]—[phenyl(Cl,F)]—O-alkyl*

YA-5 alkyl—[cyclohexyl]—[phenyl(F,Cl)]—alkyl*

YA-6 alkyl—[cyclohexyl]—[phenyl(F,Cl)]—O-alkyl*

YA-7 alkenyl—[cyclohexyl]—[phenyl(F,F)]—alkyl

YA-8 alkenyl—[cyclohexyl]—[phenyl(F,F)]—O-alkyl

YA-9 alkyl—[cyclohexyl]—[cyclohexyl]—[phenyl(F,F)]—alkyl*

YA-10 alkyl—[cyclohexyl]—[cyclohexyl]—[phenyl(F,F)]—O-alkyl*

72

-continued

YA-11 alkyl—[cyclohexyl]—[cyclohexyl]—[phenyl(Cl,F)]—alkyl*

YA-12 alkyl—[cyclohexyl]—[cyclohexyl]—[phenyl(Cl,F)]—O-alkyl*

YA-13 alkyl—[cyclohexyl]—[cyclohexyl]—[phenyl(F,Cl)]—alkyl*

YA-14 alkyl—[cyclohexyl]—[cyclohexyl]—[phenyl(F,Cl)]—O-alkyl*

YA-15 alkenyl—[cyclohexyl]—[cyclohexyl]—[phenyl(F,F)]—alkyl

YA-16 alkenyl—[cyclohexyl]—[cyclohexyl]—[phenyl(F,F)]—O-alkyl

YA-17 alkyl—[cyclohexyl]—CH₂CH₂—[phenyl(F,F)]—alkyl*

YA-18 alkyl—[cyclohexyl]—CH₂CH₂—[phenyl(F,F)]—O-alkyl*

YA-19 alkyl—[cyclohexyl]—CH₂CH₂—[phenyl(Cl,F)]—alkyl*

73

-continued

YA-20 alkyl ... Cl F O-alkyl*

YA-21 alkyl ... F Cl alkyl*

YA-22 alkyl ... F Cl O-alkyl*

YA-23 alkenyl ... F F alkyl

YA-24 alkenyl ... F F O-alkyl

YA-25 alkenyl ... Cl F alkyl

YA-26 alkenyl ... Cl F O-alkyl

YA-27 alkenyl ... F Cl alkyl

YA-28 alkenyl ... F Cl O-alkyl

74

-continued

YA-29 alkyl ... CF₂O ... F F O-alkyl*

YA-30 alkyl ... OCF₂ ... F F O-alkyl*

YA-31 alkenyl ... CF₂O ... F F O-alkyl

YA-32 alkenyl ... OCF₂ ... F F O-alkyl

YA-33 alkyl ... CF₂O ... F F (O)alkyl*

YA-34 alkyl ... OCF₂ ... F F (O)alkyl*

YA-35 alkyl ... CF₂O ... F F (O)alkyl*

YA-36 alkenyl ... OCF₂ ... F F (O)alkyl

YA-37 alkyl—[cyclohexyl]ₐ—CH=CHCH₂O ... F F (O)alkyl*

YA-38 alkyl—[cyclohexyl]ₐ—CF₂O ... F Cl (O)alkyl*

YA-39 alkyl—[cyclohexyl]—CF₂O ... Cl F (O)alkyl*

75
-continued

YA-40 alkyl—⬡—CH₂O—[ring: F F]—(O)alkyl*

YA-41 alkenyl—⬡—CH₂O—[ring: F F]—(O)alkyl

YA-42 alkyl—⬡—⬡—CH₂O—[ring: F F]—(O)alkyl*

YA-43 alkenyl—⬡—⬡—CH₂O—[ring: F F]—(O)alkyl

YA-44 alkyl—⬡—⬡—CH₂O—[ring: F F]—(O)alkyl*

YA-45 alkyl—⬡—⬡—CF₂O—[ring: F F]—(O)alkyl*

YB-1 alkyl—⬡—[ring: F F]—alkyl*

YB-2 alkyl—⬡—[ring: F F]—O-alkyl*

YB-3 alkyl—⬡—[ring: Cl F]—alkyl*

YB-4 alkyl—⬡—[ring: Cl F]—O-alkyl*

76
-continued

YB-5 alkyl—⬡—[ring: F Cl]—alkyl*

YB-6 alkyl—⬡—[ring: F Cl]—O-alkyl*

YB-7 alkenyl—⬡—[ring: F Cl]—alkyl

YB-8 alkenyl—⬡—[ring: F F]—O-alkyl

YB-9 alkyl—⬡—⬡—[ring: F F]—alkyl*

YB-10 alkyl—⬡—⬡—[ring: F F]—O-alkyl*

YB-11 alkyl—⬡—⬡—[ring: Cl F]—alkyl

YB-12 alkyl—⬡—⬡—[ring: Cl F]—O-alkyl*

YB-13 alkyl—⬡—⬡—[ring: F Cl]—alkyl

YB-14 alkyl—⬡—⬡—[ring: F Cl]—O-alkyl*

77
-continued

78
-continued

YB-15 alkenyl—⬡—◯—(F,F ring)—alkyl

YC-1 alkyl—◯—(F,F ring)—◯—alkyl*,

YB-16 alkenyl—⬡—◯—(F,F ring)—O-alkyl*

YD-1 alkyl—⬡—(F,F ring)—(O)-alkyl*

YB-17

15 alkyl—⬡—CH=CH—◯—(F,F ring)—(O)alkyl*

YD-2 alkyl—⬡—(F,Cl ring)—(O)-alkyl*

YB-18 alkyl—⬡—CH₂CH₂—◯—(F,F ring)—(O)alkyl*

YD-3 alkyl—⬡—(Cl,F ring)—(O)-alkyl*

YB-19 alkenyl—⬡—CH₂CH₂—◯—(F,F ring)—(O)alkyl*

YD-4 alkyl—⬡—CH₂—O—(F,F ring)—(O)-alkyl*

YB-20 alkyl—⬡—◯—OCF₂—(F,F ring)—(O)alkyl*

YD-5 alkyl—⬡—CH₂—O—(F,Cl ring)—(O)-alkyl*

YB-21 alkyl—⬡—◯—CF₂O—(F,F ring)—(O)alkyl*

YD-6 alkyl—⬡—CH₂—O—(Cl,F ring)—(O)-alkyl*

YB-22 alkenyl—⬡—◯—OCF₂—(F,F ring)—(O)alkyl*

YD-7 alkyl—⬡—⬡—(F,F ring)—(O)-alkyl*

YB-23 alkenyl—⬡—◯—CF₂O—(F,F ring)—(O)alkyl*

YD-8 alkyl—⬡—⬡—(Cl,F ring)—(O)alkyl*

YB-24 alkyl—⬡—◯—CF₂O—(F,F ring)—(O)alkyl*

YD-9 alkyl—⬡—⬡—(F,Cl ring)—(O)alkyl*

-continued

YD-10

YD-11

YD-12

YD-13

YD-14

YD-15 in which the parameter a denotes 1 or 2, alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2\!=\!CH\!-\!$, $CH_2\!=\!CH\!-\!CH_2CH_2\!-\!$, $CH_3\!-\!CH\!=\!CH\!-\!$, $CH_3\!-\!CH_2\!-\!CH\!=\!CH\!-\!$, $CH_3\!-\!(CH_2)_2\!-\!CH\!=\!CH\!-\!$, $CH_3\!-\!(CH_2)_3\!-\!CH\!=\!CH\!-\!$ or $CH_3\!-\!CH\!=\!CH\!-\!(CH_2)_2\!-\!$.

Particularly preferred mixtures according to the invention comprise one or more compounds of the formulae YA-2, YA-8, YA-10, YA-16, YA-18, YA-40, YA-41, YA-42, YA-43, YB-2, YB-10, YB-16, YC-1, YD-4 and YD-10.

The proportion of compounds of the formulae YA and/or YB in the mixture as a whole is preferably at least 20% by weight.

Preferred media according to the invention comprise at least one compound of the formula YC-1, in which alkyl and alkyl* have the meanings indicated above, preferably in amounts of <5% by weight, in particular >3% by weight.

The compounds of formula B are preferably selected from the compounds of the formula B-1 and/or B-2

B-1

B-2 in which the occurring groups have the same meanings as given under formula B above and preferably $R^{11}$ and $R^{12}$ each, independently of one another, an alkyl, alkenyl or alkoxy radical having up to 15 C atoms, more preferably one or both of them denote an alkoxy radical and $L^{11}$ and $L^{12}$ each preferably denote F.

Preferably, the compounds of the formula B-1 selected from the group of compounds of formulae B-1-1 to B-1-11, preferably of formula B-1-6,

B-1-1

B-1-2

B-1-3

B-1-4

-continued

B-1-5

B-1-6

B-1-7

B-1-8

B-1-9

B-1-10 in which alkyl and alkyl* each, independently of one another, denote a straight-chain alkyl radical having 1-6 C atoms, alkenyl and alkenyl* each, independently of one another, denote a straight-chain alkenyl radical having 2-6 C atoms, alkoxy and alkoxy* each, independently of one another, denote a straight-chain alkoxy radical having 1-6 C atoms, and $L^{11}$ and $L^{12}$ each, independently of one another, denote F or Cl, preferably both F.

Preferably, the compounds of the formula B-2 are selected from the group of compounds of formulae B-2-1 to B-2-10, preferably of formula B-2-6,

B-2-1

B-2-2

-continued

B-2-3

B-2-4

B-2-5

B-2-6

B-2-7

B-2-8

B-2-9

B-2-10 in which alkyl and alkyl* each, independently of one another, denote a straight-chain alkyl radical having 1-6 C atoms, alkenyl and alkenyl* each, independently of one another, denote a straight-chain alkenyl radical having 2-6 C atoms, alkoxy and alkoxy* each, independently of one another, denote a straight-chain alkoxy radical having 1-6 C atoms, and $L^1$ and $L^2$ each, independently of one another, denote F or Cl, preferably both F.

Optionally the medium comprises one or more compounds of the formula BA-1 and/or BA-2

BA-1

BA-2 in which $L^{11}$ and $L^{12}$ have the same meanings as given under formula B, (O) denotes O or a single bond, $R^{IIIA}$ denotes alkyl or alkenyl having up to 7 C atoms or a group $Cy-C_mH_{2m}—$, m and n are, identically or differently, 0, 1, 2, 3, 4, 5 or 6, preferably 1, 2 or 3, very preferably 1, Cy denotes a cycloaliphatic group having 3, 4 or 5 ring atoms, which is optionally substituted with alkyl or alkenyl each having up to 3 C atoms, or with halogen or CN, and preferably denotes cyclopropyl, cyclobutyl or cyclopentyl.

The compounds of formula BA-1 and/or BA-2 are contained in the medium either alternatively or in addition to the compounds of formula B, preferably additionally.

Very preferred compounds of the formulae BA-1 and BA-2 are the following:

BA-1-1

BA-1-2

BA-1-3

BA-1-1

BA-1-2

BA-1-3 in which alkoxy denotes a straight-chain alkoxy radical having 1-6 C atoms or alternatively $—(CH_2)_nF$ in which n is 2,3,4, or 5, preferably $C_2H_4F$.

Alternatively, the medium comprises one or more compounds of the formula BAa-1-3

BAa-1-3 in which alkenyl denotes straight chain alkenyl having 2 to 6 C atoms, preferably 4 C atoms, very preferably $CH_3—CH=CH—CH_2—$.

In a preferred embodiment of the present invention, the medium comprises one or more compounds of formula B-3

B-3 in which $R^{11}$, $R^{12}$ identically or differently, denote H, an alkyl or alkoxy radical having 1 to 15 C atoms, in which one or more $CH_2$ groups in these radicals are optionally replaced, independently of one another, by $—C\equiv C—$, $—CF_2O—$, $—OCF_2—$, $—CH=CH—$, $—O—$, $—CO—O—$ or $—O—CO—$ in such a way that O atoms are not linked directly to one another, and in which, in addition, one or more H atoms may be replaced by halogen.

The compounds of formula B-3 are preferably selected from the group of compounds of the formulae B-3-1 to B-3-10:

B-3-1

B-3-2

-continued

B-3-3

B-3-4

B-3-5

B-3-6

B-3-7

B-3-8

B-3-9

B-3-10 in which $R^{12}$ denotes alkyl having 1 to 7 C-atoms, preferably ethyl, n-propyl or n-butyl, or alternatively cyclopropylmethyl, cyclobutylmethyl or cyclopentylmethyl or alternatively —$(CH_2)_n$F in which n is 2,3,4, or 5, preferably $C_2H_4F$.

In a preferred embodiment of the present invention, the medium comprises one or more compounds of the formulae B-4 to B-6, preferably of formula B-5

B-4

-continued

B-5

B-6 in which the occurring groups have the meanings given above, $R^{11}$ preferably denotes straight-chain alkyl and $R^{12}$ preferably denotes optionally fluorinated alkoxy, each having 1 to 7 C atoms.

In a preferred embodiment the media comprise one or more compounds of the formula I selected from the group of compounds of formulae B-7 to B-9, preferably of formula B-8,

B-7

B-8

B-9 in which the parameters have the meanings given above, $R^{11}$ preferably denotes straight-chain alkyl and $R^{12}$ preferably denotes F or optionally fluorinated alkoxy each having 1 to 7 C atoms.

Particularly preferred compounds of the formulae BC, CR and PH-1 are the compounds BC-1 to BC-7, CR-1 to CR-5, and BP-1 to BP-7

BC-1

BC-2

87

-continued

BC-3

BC-4

BC-5

BC-6

BC-7

CR-1

CR-2

CR-3

CR-4

CR-5

88

-continued

BP-1

BP-2

BP-3

BP-4

BP-5

BP-6

BP-7 in which alkyl and alkyl* each, independently of one another, denote a straight-chain alkyl radical having 1 to 6 C atoms, and alkenyl and alkenyl* each, independently of one another, denote a straight-chain alkenyl radical having 2 to 6 C atoms.

More preference is given to mixtures comprising one, two or three compounds of the formula BC-2, BC-3, BP-2 and/or BP-3, very preferably BP-2 and/or BP-3, in particular BP-3.

In a preferred embodiment, the medium according to the invention comprises one or more HALS-stabilisers of the formula H:

$$Ar\text{---}[Sp\text{---}\underset{G}{\overset{Z^S\text{---}HA}{\underset{|}{\overset{|}{C}}}}\text{---}R^S]_q$$

H in which

Ar denotes a methylene group or an aromatic hydrocarbon group having 6 to 40 C atoms or a heteroaromatic hydrocarbon group having 4 to 40 C atoms; preferably an aromatic hydrocarbon group having 6 to 40 C atoms;

Sp denotes a spacer group;

$R^S$ denotes H, alkyl having 1 to 12 C atoms or alkenyl having 2 to 12 C atoms;

$Z^S$ denotes —O—, —C(O)O—, —(CH$_2$)$_z$— or —(CH$_2$)$_z$O—, or a single bond;

HA denotes $R^H$ denotes H, O·, CH$_3$, OH or OR$^S$;

$R^{S1}$, $R^{S2}$, RRs and $R^{S4}$, identically or differently, denote alkyl having 1 to 6 C atoms, preferably having 1 to 3 C atoms, very preferably CH$_3$;

G denotes H or R$^S$ or a group $Z^S$-HA;

z is an integer from 1 to 6, and q is 2, 3 or 4, preferably 3 or 4;

The compounds of formula I are preferably selected from the compounds of the formulae H-1, H-2 and H-3:

H-1

H-2

H-3 in which $R^H$ has the meanings given above and preferably denotes H or O·,

Sp on each occurrence, identically or differently, denotes a spacer group, and

W denotes linear or branched, optionally unsaturated alkylene having 1 to 12 C atoms, in which one or more non-adjacent —CH$_2$— groups may be replaced with —O—.

Preferred compounds of formula H-1 are selected from the compounds of the formula H-1-1:

H-1-1 in which $R^H$ has the meanings given above and preferably denotes H or O·, and n is an integer from 0 to 12, preferably 5, 6, 7, 8 or 9, very preferably 7.

Preferred compounds of formula H-2 are selected from the compounds of the formula H-2-1:

H-2-1 in which $R^H$ has the meanings given above and preferably denotes H or O·, and n2, on each occurrence identically or differently, preferably identically, is an integer from 1 to 12, preferably 2, 3, 4, 5, or 6, very preferably 3, and $R^S$ on each occurrence identically or differently, preferably identically, denotes alkyl having 1 to 6 C atoms, preferably n-butyl.

Preferred compounds of formula H-3 are selected from the compounds of the formula H-3-1:

H-3-1 in which $R^H$ has the meanings given above and preferably denotes H or O·, and n is an integer from 0 to 12, preferably 5, 6, 7, 8 or 9, very preferably 7.

Preferably, the media according to the invention, comprise a stabilizer selected from the group of compounds of the formulae ST-4 to ST-49.

ST-1

ST-2

ST-3

ST-4

ST-5

ST-6

95

96

ST-7

ST-8

ST-9

ST-10

ST-11

ST-12

ST-13

ST-14

ST-15

97
98

ST-16

ST-17

ST-18

ST-19

99    100

-continued

ST-20

ST-21

ST-22

ST-23 in which

R$^{ST}$ denotes H, an alkyl or alkoxy radical having 1 to 15 C atoms, where, in addition, one or more CH$_2$ groups in these radicals may each be replaced, independently of one another, by —C≡C—, —CF$_2$O—, —OCF$_2$—, —CH=CH—, —O—, —CO—O—, —O—CO— in such a way that O atoms are not linked directly to one another, and in which, in addition, one or more H atoms may be replaced by halogen, denotes -continued Z$^{ST}$ each, independently of one another, denote —CO—
O—, —O—CO—, —CF$_2$O—, —OCF$_2$—,
—CH$_2$O—, —OCH$_2$—, —CH$_2$—, —CH$_2$CH$_2$—,
—(CH$_2$)$_4$—, —CH=CH—, —CH$_2$O—, —C$_2$F$_4$—,
—CH$_2$CF$_2$—, —CF$_2$CH$_2$—, —CF=CF—,
—CH=CF—, —CF=CH—, —CH=CH—,
—C≡C— or a single bond,
L$^1$ and L$^2$ each, independently of one another, denote F,
Cl, CF$_3$ or CHF$_2$,
n is an integer from 0 to 12, preferably 5, 6, 7, 8 or 9, very
preferably 7,
n2, on each occurrence identically or differently, prefer-
ably identically, is an integer from 1 to 12, preferably
2, 3, 4, 5, or 6, very preferably 3, and
R$^S$ on each occurrence identically or differently, prefer-
ably identically, denotes alkyl having 1 to 6 C atoms,
preferably n-butyl,
p denotes 1 or 2,
q denotes 1, 2, 3, 4, 5, 6, 7, 8, 9 or 10.
Of the compounds of the formula ST, special preference
is given to the compounds of the formulae

ST-1

ST-3c

-continued

ST-2a in which n=1, 2, 3, 4, 5, 6 or 7, preferably n=1 or 7

ST-3a in which n=1, 2, 3, 4, 5, 6 or 7, preferably n=3

ST-3b in which n=1, 2, 3, 4, 5, 6 or 7, preferably n=3

ST-3d 105 106

-continued

ST-8-1

ST-9-1

ST-12

ST-16

ST-17

ST-18

ST-19a

In the compounds of the formulae ST-3a and ST-3b, n preferably denotes 3. In the compounds of the formula ST-2a, n preferably denotes 7.

Very particularly preferred mixtures according to the invention comprise one or more stabilizers from the group of the compounds of the formulae ST-2a-1, ST-3a-1, ST-3b-1, ST-8-1, ST-9-1 and ST-12:

ST-2a-1

ST-3a-1

ST-3b-1

ST-8-1

ST-9-1

-continued

ST-12

The compounds of the formulae ST-1 to ST-19 are preferably each present in the liquid-crystal mixtures according to the invention in amounts of 0.005-0.5%, based on the mixture.

If the mixtures according to the invention comprise two or more compounds from the group of the compounds of the formulae ST-1 to ST-19, the concentration correspondingly increases to 0.01-1% in the case of two compounds, based on the mixtures.

However, the total proportion of the compounds of the formulae ST-1 to ST-19, based on the mixture according to the invention, should not exceed 2%.

In another preferred embodiment of the present invention the liquid-crystalline medium additionally comprises one or more polymerisable compounds. The polymerisable compounds are preferably selected from formula M $$R^a—B^1—(Z^b—B^2)_m—R^b \qquad\qquad M$$

in which the individual radicals, on each occurrence identically or differently, and each, independently of one another, have the following meaning:

$R^a$ and $R^b$ P, P-Sp-, H, F, Cl, Br, I, —CN, —NO$_2$, —NCO, —NCS, —OCN, —SCN, SF$_5$ or straight-chain or branched alkyl having 1 to 25 C atoms, in which, in addition, one or more non-adjacent CH$_2$ groups may each be replaced, independently of one another, by —C(R$^0$)=C(R$^{00}$)—, —C≡C—, —N(R$^{00}$)—, —O—, —S—, —CO—, —CO—O—, —O—CO—, —O—CO—O— in such a way that O and/or S atoms are not linked directly to one another, and in which, in addition, one or more H atoms may be replaced by F, C, Br, I, CN, P or P-Sp-, where, if B$^1$ and/or B$^2$ contain a saturated C atom, R$^a$ and/or R$^b$ may also denote a radical which is spiro-linked to this saturated C atom, wherein at least one of the radicals R$^a$ and R$^b$ denotes or contains a group P or P-Sp-, P a polymerisable group, Sp a spacer group or a single bond, B$^1$ and B$^2$ an aromatic, heteroaromatic, alicyclic or heterocyclic group, preferably having 4 to 25 ring atoms, which may also contain fused rings, and which is unsubstituted, or mono- or polysubstituted by L, $Z^b$ —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —$(CF_2)_{n1}$—, —CH=CH—, —CF=CF—, —C≡C—,
—CH=CH—COO—, —OCO—CH=CH—, $CR^OR^{OO}$
or a single bond, $R^O$ and $R^{OO}$ each, independently of one another, denote H or alkyl having 1 to 12 C atoms, m denotes 0, 1, 2, 3 or 4, n1 denotes 1, 2, 3 or 4, L P, P-Sp-, OH, $CH_2OH$, F, C, Br, I, —CN, —$NO_2$, —NCO, —NCS, —OCN, —SCN, —C(=O)N($R^x$)$_2$, —C(=O)Y$^1$, —C(=O)$R^x$, —N($R^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl, P or P-Sp-, P and Sp have the meanings indicated above, $Y^1$ denotes halogen, $R^x$ denotes P, P-Sp-, H, halogen, straight-chain, branched or cyclic alkyl having 1 to 25 C atoms, in which, in addition, one or more non-adjacent $CH_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl, P or P-Sp-, an optionally substituted aryl or aryloxy group having 6 to 40 C atoms, or an optionally substituted heteroaryl or heteroaryloxy group having 2 to 40 C atoms.

Particularly preferred compounds of the formula I are those in which B$^1$ and B$^2$ each, independently of one another, denote 1,4-phenylene, 1,3-phenylene, naphthalene-1,4-diyl, naphthalene-2,6-diyl, phenanthrene-2,7-diyl, 9,10-dihydro-phenanthrene-2,7-diyl, anthracene-2,7-diyl, fluorene-2,7-diyl, coumarin, flavone, where, in addition, one or more CH groups in these groups may be replaced by N, cyclohexane-1,4-diyl, in which, in addition, one or more non-adjacent $CH_2$ groups may be replaced by 0 and/or S, 1,4-cyclohexenylene, bicycle[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindene-2,5-diyl, where all these groups may be unsubstituted or mono- or polysubstituted by L as defined above.

Particularly preferred compounds of the formula M are those in which B$^1$ and B$^2$ each, independently of one another, denote 1,4-phenylene, 1,3-phenylene, naphthalene-1,4-diyl or naphthalene-2,6-diyl, Very preferred compounds of formula M are selected from the following formulae:

M1

M2

M3

M4

M5

M6

M7

M8

M9

M10

M11

M12

111
-continued

112
-continued

M13

M14

M15

M16

M17

M18

M19

M20

M21

M22

M23

M24

M25

M26

M27

-continued

M28

M29

M30

M31 in which the individual radicals, on each occurrence identically or differently, and each, independently of one another, have the following meaning:

P$^1$, P$^2$, P$^3$ a polymerisable group, preferably selected from vinyloxy, acrylate, methacrylate, fluoroacrylate, chloroacrylate, oxetane and epoxy, Sp$^1$, Sp$^2$, Sp$^3$ a single bond or a spacer group where, in addition, one or more of the radicals P$^1$-Sp$^1$-, P$^1$-Sp$^2$- and P$^3$-Sp$^3$- may denote R$^{aa}$, with the proviso that at least one of the radicals P$^1$-Sp$^1$-, P$^2$-Sp$^2$ and P$^3$-Sp$^3$- present is different from R$^{aa}$, preferably denote —(CH$_2$)$_{p1}$—, —(CH$_2$)$_{p1}$—O—, —(CH$_2$)$_{p1}$—CO—O— or —(CH$_2$)$_{p1}$—O—CO—O—, wherein p1 is an integer from 1 to 12, R$^{aa}$ H, F, Cl, CN or straight-chain or branched alkyl having 1 to 25 C atoms, in which, in addition, one or more non-adjacent CH$_2$ groups may each be replaced, independently of one another, by —C(R$^0$)=C(R$^{00}$)—, —C≡C—, —N(R$^0$)—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or P$^1$-Sp$^1$-, particularly preferably straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms (where the alkenyl and alkynyl radicals have at least two C atoms and the branched radicals have at least three C atoms), R$^0$, R$^{00}$ H or alkyl having 1 to 12 C atoms, R$^y$ and R$^z$ H, F, CH$_3$ or CF$_3$, X$^1$, X$^2$, X$^3$ —CO—O—, —O—CO— or a single bond, Z$^{M1}$ —O—, —CO—, —C(R$^y$R$^z$)— or —CF$_2$CF$_2$—, Z$^{M2}$, Z$^{M3}$ —CO—O—, —O—CO—, —CH$_2$O—, —OCH$_2$—, —CF$_2$O—, —OCF$_2$— or —(CH$_2$)$_n$—, where n is 2, 3 or 4, L F, Cl, CN or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, L', L" H, For Cl, r 0, 1, 2, 3 or 4, s 0, 1, 2 or 3, t 0.1 or 2, x 0 or 1.

Especially preferred are compounds of formulae M2 and M13.

Further preferred are trireactive compounds M15 to M31, in particular M17, M18, M19, M22, M23, M24, M25, M30 and M31.

In the compounds of formulae M1 to M31 the group in which L has one of the meanings indicated above and r denotes 0, 1, 2, 3 or 4, in particular denotes in which L on each occurrence, identically or differently, has one of the meanings given above or below, and is preferably F, Cl, CN, NO$_2$, CH$_3$, C$_2$H$_5$, C(CH$_3$)$_3$, CH(CH$_3$)$_2$, CH$_2$CH (CH$_3$)C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$ or P-Sp-, very preferably F, C, CN, CH$_3$, C$_2$H$_5$, OCH$_3$, COCH$_3$, OCF$_3$ or P-Sp-, more preferably F, Cl, CH$_3$, OCH$_3$, COCH$_3$ or OCF$_3$, especially F or CH$_3$.

Preferred compounds of formulae M1 to M31 are those in which P$^1$, P$^2$ and P$^3$ denote an acrylate, methacrylate, oxetane or epoxy group, very preferably an acrylate or methacrylate group.

Further preferred compounds of formulae M1 to M31 are those in which Sp$^1$, Sp$^2$ and Sp$^3$ are a single bond.

Further preferred compounds of formulae M1 to M31 are those in which one of Sp$^1$, Sp$^2$ and Sp$^3$ is a single bond and another one of Sp$^1$, Sp$^2$ and Sp$^3$ is different from a single bond.

Further preferred compounds of formulae M1 to M31 are those in which those groups $Sp^1$, $Sp^2$ and $Sp^3$ that are different from a single bond denote —$(CH_2)_{s1}$—X"—, wherein s1 is an integer from 1 to 6, preferably 2, 3, 4 or 5, and X" is X" is the linkage to the benzene ring and is —O—, —O—CO—, —CO—O—, —O—CO—O— or a single bond.

Particular preference is given to liquid-crystalline media comprising one, two or three polymerisable compounds of formula M, preferably selected from formulae M1 to M31.

Further preferably the liquid-crystalline media according to the present invention comprise one or more polymerisable compounds selected from Table E below.

Preferably the proportion of polymerisable compounds in the liquid-crystalline medium, preferably selected from formula M and Table E, is from 0.01 to 5%, very preferably from 0.05 to 1%, most preferably from 0.1 to 0.5%.

It was observed that the addition of one or more polymerisable compounds to the liquid-crystalline medium, like those selected from formula M and Table E, leads to advantageous properties like fast response times. Such a liquid-crystalline medium is especially suitable for use in PSA displays where it shows low image sticking, a quick and complete polymerisation, the quick generation of a low pretilt angle which is stable after UV exposure, a high reliability, high VHR value after UV exposure, and a high birefringence. By appropriate selection of the polymerisable compounds, it is possible to increase the absorption of the liquid-crystalline medium at longer UV wavelengths, so that it is possible to use such longer UV wavelengths for polymerisation, which is advantageous for the display manufacturing process.

The polymerisable group P is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C=C double bond or —C≡C— triple bond, and groups which are suitable for polymerisation with ring opening, such as, for example, oxetane or epoxide groups.

Preferred groups P are selected from the group consisting of $CH_2$=$CW^1$—CO—O—, $CH_2$=$CW^1$—CO—, $CH_2$=$CW^2$—(O)$_{k3}$—, $CW^1$=CH—CO—(O)$_{k3}$—, $CW^1$=CH—CO—NH—, $CH_2$=$CW^1$—CO—NH—, $CH_3$—CH=CH—O—, $(CH_2$=CH)$_2$CH—OCO—, $(CH_2$=CH—CH$_2)_2$CH—OCO—, $(CH_2$=CH)$_2$CH—O—, $(CH_2$=CH—CH$_2)_2$N—, $(CH_2$=CH—CH$_2)_2$N—CO—, HO—$CW^2W^3$—, HS—$CW^2W^3$—, $HW^2$N—, HO—$CW^2W^3$—NH—, $CH_2$=$CW^1$—CO—NH—, $CH_2$=CH—(COO)$_{k1}$-Phe-(O)$_{k2}$—, $CH_2$=CH—(CO)$_{k1}$-Phe-(O)$_{k2}$—, Phe-CH=CH—, HOOC—, OCN— and $W^4W^5W^6$Si—, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^a$ each, independently of one another, denote H, Cl or alkyl having 1 to 5 C atoms, Phe denotes 1,4-phenylene, which is optionally substituted by one or more radicals L as defined above which are other than P-Sp-, $k_1$, $k_2$ and $k_3$ each, independently of one another, denote 0 or 1, $k_3$ preferably denotes 1, and $k_4$ denotes an integer from 1 to 10.

Very preferred groups P are selected from the group consisting of $CH_2$=$CW^1$—CO—O—, $CH_2$=$CW^1$—CO—, $CH_2$=$CW^2$—O—, $CH_2$=$CW^2$—, $CW^1$=CH—CO—(O)$_{k3}$—, $CW^1$=CH—CO—NH—, $CH_2$=$CW^1$—CO—NH—, $(CH_2$=CH)$_2$CH—OCO—, $(CH_2$=CH—CH$_2)_2$CH—OCO—, $(CH_2$=CH)$_2$CH—O—, $(CH_2$=CH—CH$_2)_2$N—, $(CH_2$=CH—CH$_2)_2$N—CO—, $CH_2$=$CW^1$—CO—NH—, $CH_2$=CH—(COO)$_k$, -Phe-(O)$_{k2}$—, $CH_2$=CH—(CO)$_{k1}$-Phe-(O)$_{k2}$—, Phe-CH=CH— and $W^4W^5W^6$Si—, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, $k_1$, $k_2$ and $k_3$ each, independently of one another, denote 0 or 1, $k_3$ preferably denotes 1, and $k_4$ denotes an integer from 1 to 10.

Very particularly preferred groups P are selected from the group consisting of $CH_2$=$CW^1$—CO—O—, in particular $CH_2$=CH—CO—O—, $CH_2$=C$(CH_3)$—CO—O— and $CH_2$=CF—CO—O—, furthermore $CH_2$=CH—O—, $(CH_2$=CH)$_2$CH—O—CO—, $(CH_2$=CH)$_2$CH—O—, Further preferred polymerisable groups P are selected from the group consisting of vinyloxy, acrylate, methacrylate, fluoroacrylate, chloroacrylate, oxetane and epoxide, most preferably from acrylate and methacrylate.

If Sp is different from a single bond, it is preferably of the formula Sp"—X", so that the respective radical P-Sp- conforms to the formula P-Sp"—X"—, wherein Sp" denotes alkylene having 1 to 20, preferably 1 to 12, C atoms, which is optionally mono- or polysubstituted by F, C, Br, I or CN and in which, in addition, one or more non-adjacent $CH_2$ groups may each be replaced, independently of one another, by —O—, —S—, —NH—, —N($R^0$)—, —Si($R^0R^{00}$)—, —CO—, —CO—O—, —O—CO—, —O—CO—O—, —S—CO—, —CO—S—, —N($R^{00}$)—CO—O—, —O—CO—N($R^0$)—, —N($R^0$)—CO—N($R^{00}$)—, —CH=CH— or —C≡C— in such a way that O and/or S atoms are not linked directly to one another, X" denotes —O—, —S—, —CO—, —CO—O—, —O—CO—, —O—CO—O—, —CO—N($R^0$)—, —N($R^0$)—CO—, —N($R^0$)—CO—N($R^{00}$)—, —O$CH_2$—, —$CH_2$O—, —S$CH_2$—, —$CH_2$S—, —$CF_2$O—, —O$CF_2$—, —$CF_2$S—, —S$CF_2$—, —$CF_2CH_2$—, —$CH_2CF_2$—, —$CF_2CF_2$—, —CH=N—, —N=CH—, —N=N—, —CH=C$R^0$—, —C$Y^2$=C$Y^3$—, —C≡C—, —CH=CH—CO—O—, —O—CO—CH=CH— or a single bond, $R^0$ and $R^{00}$ each, independently of one another, denote H or alkyl having 1 to 20 C atoms, and $Y^2$ and $Y^3$ each, independently of one another, denote H, F, Cl or CN.

X" is preferably —O—, —S—, —CO—, —COO—, —OCO—, —O—COO—, —CO—N$R^0$—, —N$R^0$—CO—, —N$R^0$—CO—N$R^{00}$— or a single bond.

Typical spacer groups Sp and -Sp"—X"— are, for example, —$(CH_2)_{p1}$—, —$(CH_2CH_2O)_{q1}$—$CH_2CH_2$—, —$CH_2CH_2$—S—$CH_2CH_2$—, —$CH_2CH_2$—NH—$CH_2CH_2$— or —$(SiR^0R^{00}$—O$)_{p1}$—, in which p1 is an integer from 1 to 12, q1 is an integer from 1 to 3, and $R^0$ and $R^{00}$ have the meanings indicated above.

Particularly preferred groups Sp and -Sp"—X"— are —$(CH_2)_{p1}$—, —$(CH_2)_{p1}$—O—, —$(CH_2)_{p1}$—O—CO—, —$(CH_2)_{p1}$—CO—O—, —$(CH_2)_{p1}$—O—CO—O—, in which p1 and q1 have the meanings indicated above.

Particularly preferred groups Sp" are, in each case straight-chain, ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

For the production of PSA displays, the polymerisable compounds contained in the liquid-crystalline medium are polymerised or crosslinked (if one compound contains two or more polymerisable groups) by in-situ polymerisation in the liquid-crystalline medium between the substrates of the LC display, optionally while a voltage is applied to the electrodes.

The structure of the PSA displays according to the invention corresponds to the usual geometry for PSA displays, as described in the prior art cited at the outset. Geometries without protrusions are preferred, in particular those in which, in addition, the electrode on the colour filter side is unstructured and only the electrode on the TFT side has slots. Particularly suitable and preferred electrode structures for PS-VA displays are described, for example, in US 2006/0066793 A1.

The combination of compounds of the preferred embodiments mentioned above with the polymerised compounds described above causes low threshold voltages, low rotational viscosities and very good low-temperature stabilities in the liquid-crystalline media according to the invention at the same time as constantly high clearing points and high VHR values.

The use of liquid-crystalline media containing polymerisable compounds allows the rapid establishment of a particularly low pretilt angle in PSA displays. In particular, the liquid-crystalline media exhibit significantly shortened response times, in particular also the grey-shade response times, in PSA displays compared with the media from the prior art.

In further preferred embodiments, taken alone or in combination with one another, the medium according to the invention comprises the following compounds, where the acronyms are explained in Table D below:

one, two or more compounds of formula I in a total concentration in the range of from 0.5% to 10%, preferably 1% to 7%, particularly preferably 2% to 5%;

one or more compounds of formula II, preferably of formula II-1, more preferably of the sub-formulae II-1a and/or II-1f and/or II-1g and/or II-1 h, in particular formula II-1a-1 and II-1f-1 and II-1h-1, or formula II-1f-1 and II-1g-1 and II-1h-1, preferably in a total concentration in the range of from 3% to 20%, preferably from 5% to 18%, particularly preferably from 7% to 15%;

and/or one or more compounds of formula III in a total concentration in the range of from 0.1% to 10%, preferably from 0.2% to 7%, more preferably from 0.3% to 2%, preferably selected from the group of compounds of formula III-2, more preferably of the formulae III-2c and/or III-2i and/or III-2l and/or III-2m, very preferably of the formulae III-2c-4 and/or III-2i-3 and/or III-2l-3 and/or III-2m-1, in particular of the formulae III-2i-3 and III-2m-1, where the concentration of the compound(s) of the formula III-2m-1 is very preferably 1% or less;

and/or one or more compounds of the formula YA, preferably of the formula YA-2 and/or YA-10 in a total concentration in the range of from 1% to 10%, preferably 2% to 8%, particularly preferably 3% to 7%;

and/or one or more compounds of the formula YD, preferably of the formula YD-7 and/or YD-10 in a total concentration in the range of from 1% to 10%, preferably 2% to 8%, particularly preferably 3% to 7%;

and/or one or more compounds of the formula YB, preferably of the formulae YB-2 and/or YB-10 in a total concentration in the range of from 0.5% to 10%, preferably 1% to 7%, particularly preferably 2% to 5%;

and/or one or more compounds of the formula I and YD and optionally YA, preferably selected from the compounds of the formulae YA-2, YA-10, YD-7 and YD-10 in a total concentration in the range of from 1% to 20%, preferably 3% to 17%, particularly preferably 4% to 14%;

and/or one or more compounds of the formula B, preferably B-8, very preferably of the formula LB(S)-n-OT, in particular LB(S)-3-OT, in a total concentration in the range of from 0.1% to 10%, preferably 0.5% to 5%, particularly preferably 1% to 4%;

and/or less than 5% of one or more compounds of the formula IV-1, preferably less than 3%, very preferably less than 1%;

and/or
one or more compounds of formula IV, preferably of the formula IV-3, in a total concentration in the range of from 20% to 70%, more preferably 30% to 60%, very preferably 33% to 50%, preferably selected from the compounds of the formulae IV-3-1 to IV-3-6, in particular selected from the compounds of formula IV-3-1, IV-3-2, IV-3-4 and IV-3-6;
and/or
–0.5% to 8%, preferably 1% to 6% of the compound IV-3-6 (CC-3-2V1) or IV-3-4 (CC-4-V1);
and/or
one or more compounds of formula IVa, preferably of formula IVa-2, preferably in a total concentration in the range of from 0.1% to 3%, more preferably from 0.2% to 2%;
and/or
one or more compounds of formula IVb, preferably of formula IVb-2, very preferably of formula IVb-2-3, preferably in a total concentration in the range of from 0.2% to 8%, more preferably from 0.5% to 7%, in particular from 1% to 6%;
and/or
one or more compounds of formula V, preferably selected from the group consisting of the compounds V-1-1, V-1-6, V-2-1, V-2-2, V-2-3, V-2-4, V-3-4 and V-4-1, preferably in a total concentration in the range of from 5% to 50%, preferably from 10% to 40%, in particular from 15% to 33%;
and/or
one or more compounds of formula CL, preferably selected from the formula CL-3, preferably in a total concentration in the range of from 1% to 15%, preferably from 2% to 12%, in particular from 3% to 10%;
and/or
one or more compounds of formula V and one or more compounds of formula CL, preferably in a total concentration in the range of from 5% to 50%, preferably from 10% to 40%, in particular from 15% to 33%;
and/or
one or more compounds of formula V-1-1 or IV-1-6, preferably selected from the compounds CCC-n-V, CCC-V-V and CVCC-n-m, preferably in a total concentration in the range of from 0.5% to 10%, preferably from 0.75% to 7%, in particular from 1% to 5%;
and/or
one or more compounds of formula V-2-1 and/or V-2-2, preferably CCP-n-m and/or CCP-Vn-m and/or CPP-n-m, very particularly selected from the group consisting of CCP-3-1, CCP-V-1, and CCP-V2-1, preferably in a total concentration in the range of from 8% to 20%, more preferably from 12% to 17%, very preferably from 15% to 27%;
and/or
one or more compounds of formula VII, preferably of the formula VII-1-20 and/or VII-1-21, preferably in a total concentration in the range of from 1% to 15%, preferably from 2% to 10%, in particular from 3% to 7%;
and/or
one or more compounds of formula VIII, preferably selected from the compounds of the formula VIII-3, more preferably VIII-3a, preferably in a total concentration in the range of from 2% to 20%, preferably from 5% to 17%, in particular from 8% to 14%;
The liquid-crystalline media according to the invention, while retaining the nematic phase down to −20° C. and preferably down to −30° C., particularly preferably down to −40° C., and the clearing point ≥75° C., preferably ≥79° C., at the same time allow rotational viscosities γ, of ≤80 mPa·s, particularly preferably ≤70 mPa·s, to be achieved, enabling excellent MLC displays having fast response times. The rotational viscosities are determined at 20° C.

The dielectric anisotropy $\Delta\varepsilon$ of the liquid-crystalline media according to the invention at 20° C. and 1 kHz is preferably ≥1.5, preferably in the range of from ≥1.5 to 8, more preferably from 2.0 to 6.0, very preferably from 2.5 to 4.6 and particularly preferably from 3.0 to 4.4.

The birefringence $\Delta n$ of the liquid-crystalline media according to the invention is preferably from 0.080 to 0.140, very preferably from 0.090 to 0.135, in particular from 0.091 to 0.132.

In a preferred embodiment of the present invention the medium has a birefringence of from 0.080 to 0.100, very preferably from 0.085 to 0.098, in particular from 0.090 to 0.094.

In a preferred embodiment of the present invention the medium has a birefringence of from 0.110 to 0.130, very preferably from 0.119 to 0.128, in particular from 0.120 to 0.123.

In a preferred embodiment of the present invention the medium has a birefringence of from 0.120 to 0.140, very preferably from 0.125 to 0.135, in particular from 0.129 to 0.132.

The rotational viscosity $\gamma_1$ of the liquid-crystalline media according to the invention is preferably ≤120 mPa s, more preferably ≤110 mPa s, very preferably ≤105 mPa s.

The ratio $\gamma_1/K_1$ of the liquid-crystalline media according to the invention is preferably ≤5.5 mPa·s/pN, more preferably ≤5.3 mPa·s/pN, very preferably ≤5.0 mPa·s/pN.

Herein, the structures of the mesogenic compounds are indicated by means of abbreviations, also referred to as acronyms. In these acronyms, the chemical formulae are abbreviated as follows using Tables A to C below. All groups $C_nH_{2n+1}$, $C_mH_{2m+1}$ and $C_1H_{2l+1}$, and $C_nH_{2n-1}$, $C_mH_{2m-1}$, and $C_1H_{2l-1}$ denote straight-chain alkyl or alkylene, respectively, in each case having n, m or l C atoms, wherein n and m, independently are 1, 2, 3, 4, 5, 6 or 7 and l is 1, 2 or 3. Table A lists the codes used for the ring elements of the core structures of the compounds, while Table B and Table C show the linking groups and end groups. Table D shows illustrative structures of compounds with their respective abbreviations.

TABLE A

| Ring elements | |
| --- | --- |
| C | |
| D | |
| DI | |
| A | |

121

122

TABLE A-continued

TABLE A-continued

| Ring elements | | | Ring elements | |
|---|---|---|---|---|
| AI | | 5 | MI | |
| G | | 10 | N | |
| GI | | 15 | NI | |
| U | | 20 | K | |
| UI | | 25 | KI | |
| U(1) | | 30 | L | |
| U(1)I | | 35 | LI | |
| Y | | 40 | F | |
| Y(1) | | 45 | FI | |
| M | | 50 | P | |
| | | 55 | P(o) | |
| | | 60 | P(i3) | |
| | | 65 | | |

123

TABLE A-continued

| Ring elements | |
|---|---|
| PI(o) | $C_oH_{2o+1}$ |
| O | |
| S | |
| cpS | |
| B | |

124

TABLE A-continued

| Ring elements | |
|---|---|
| B(S) | |
| B(P) | |
| B(A) | |

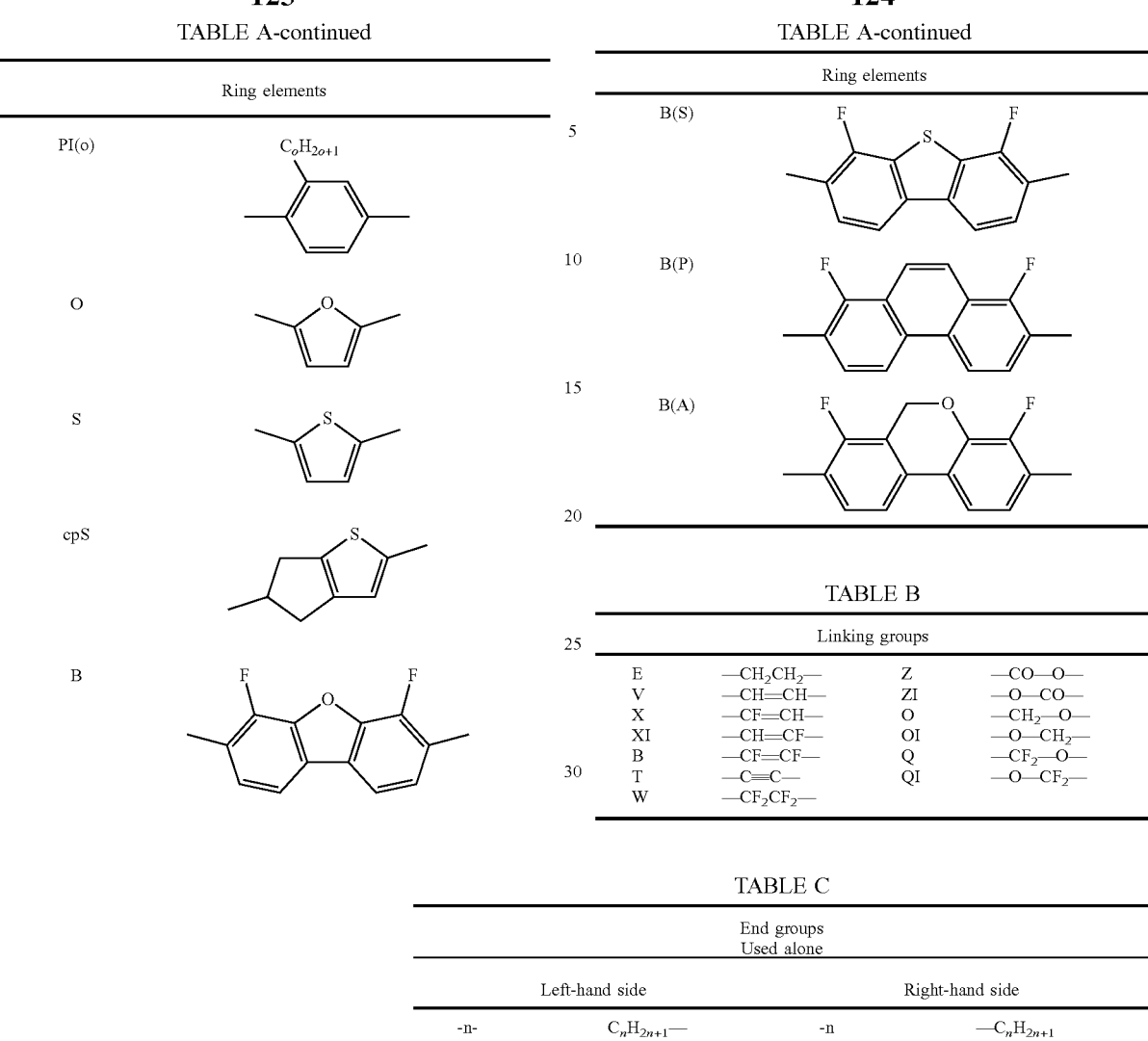

TABLE B

| | Linking groups | | |
|---|---|---|---|
| E | —CH₂CH₂— | Z | —CO—O— |
| V | —CH=CH— | ZI | —O—CO— |
| X | —CF=CH— | O | —CH₂—O— |
| XI | —CH=CF— | OI | —O—CH₂— |
| B | —CF=CF— | Q | —CF₂—O— |
| T | —C≡C— | QI | —O—CF₂— |
| W | —CF₂CF₂— | | |

TABLE C

| | End groups<br>Used alone | | |
|---|---|---|---|
| Left-hand side | | Right-hand side | |
| -n- | $C_nH_{2n+1}$— | -n | —$C_nH_{2n+1}$ |
| -nO— | $C_nH_{2n+1}$—O— | —On | —O—$C_nH_{2n+1}$ |
| —V— | CH₂=CH— | —V | —CH=CH₂ |
| -nV— | $C_nH_{2n+1}$—CH=CH— | -nV | —$C_nH_{2n}$—CH=CH₂ |
| —Vn- | CH₂=CH—$C_nH_{2n+1}$— | —Vn | —CH=CH—$C_nH_{2n+1}$ |
| -nVm- | $C_nH_{2n+1}$—CH=CH—$C_mH_{2m}$— | -nVm | —$C_nH_{2n}$—CH=CH—$C_mH_{2m+1}$ |
| —N— | N≡C— | —N | —C≡N |
| —S— | S=C=N— | —S | —N=C=S |
| —F— | F— | —F | —F |
| —Cl— | Cl— | —Cl | —Cl |
| -M- | CFH₂— | -M | —CFH₂ |
| -D- | CF₂H— | -D | —CF₂H |
| -T- | CF₃— | -T | —CF₃ |
| -MO— | CFH₂O— | —OM | —OCFH₂ |
| -DO— | CF₂HO— | —OD | —OCF₂H |
| -TO— | CF₃O— | —OT | —OCF₃ |
| -FXO— | CF₂=CH—O— | —OXF | —O—CH=CF₂ |
| -A- | H—C≡C— | -A | —C≡C—H |
| -nA- | $C_nH_{2n+1}$—C≡C— | -An | —C≡C—$C_nH_{2n+1}$ |
| —NA- | N≡C—C≡C— | -AN | —C≡C—C≡N |
| -(cn)- | (CH₂)ₙ₋₂ | -(cn) | (CH₂)ₙ₋₂ |
| -(cn)m- | (CH₂)ₙ₋₂ —(CH₂)ₘ— | -m(cn) | —(CH₂)ₘ (CH₂)ₙ₋₂ |
| -(c5-1en)m- | —(CH₂)ₘ— | -m(c5-1en) | —(CH₂)ₘ |

TABLE C-continued

| End groups Used alone | | | |
|---|---|---|---|
| Left-hand side | | Right-hand side | |
| -(c5-2en)m- | 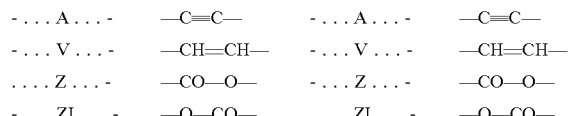 (CH₂)_m — | -m(c5-2en) | — (CH₂)_m |
| -(c5-3en)m- | (CH₂)_m — | -m(c5-3en) | — (CH₂)_m |

| - . . . A . . . - | —C≡C— | - . . . A . . . - | —C≡C— |
|---|---|---|---|
| - . . . V . . . - | —CH=CH— | - . . . V . . . - | —CH=CH— |
| . . . . Z . . . - | —CO—O— | - . . . Z . . . - | —CO—O— |
| - . . . ZI . . . - | —O—CO— | . . . . ZI . . . - | —O—CO— |

-continued

| - . . . K . . . - | —CO— | - . . . K . . . - | —CO— |
|---|---|---|---|
| - . . . W . . . - | —CF=CF— | - . . . W . . . - | —CF=CF— | in which n and m each denote integers, and the three dots " . . . " are placeholders for other abbreviations from this table.

TABLE D

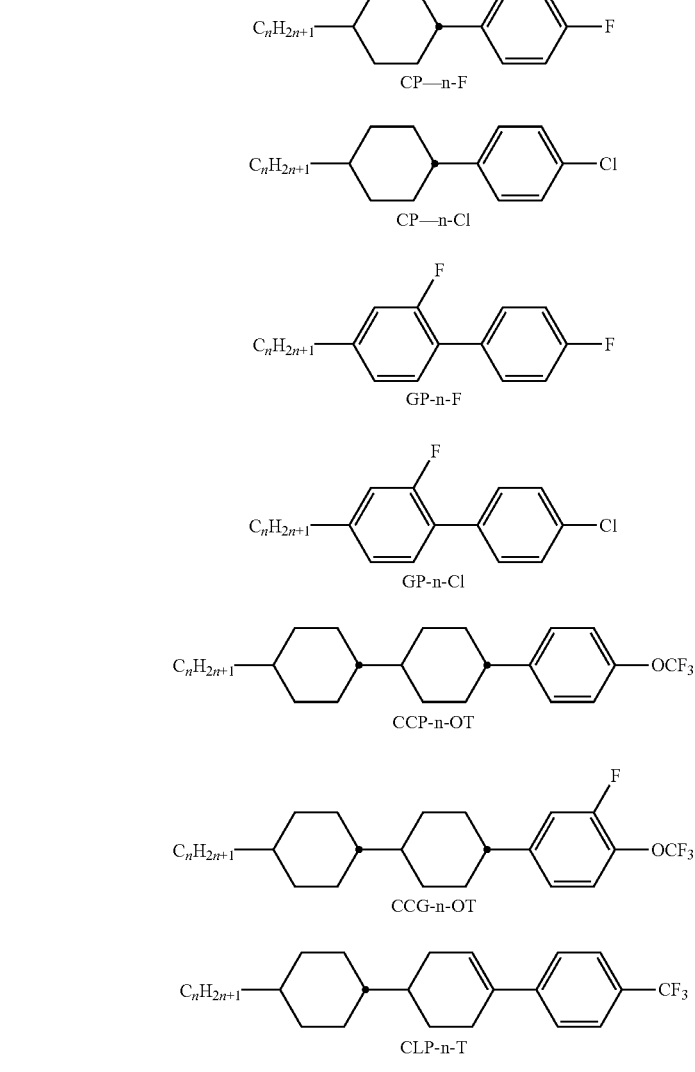

$C_nH_{2n+1}$ — ... — F

CP—n-F $C_nH_{2n+1}$ — ... — Cl

CP—n-Cl

GP-n-F

GP-n-Cl

CCP-n-OT

CCG-n-OT

CLP-n-T

TABLE D-continued

CCG-n-F

CCG-V—F

CCG-nV-F

CCU—n-F

CCEP-n-F

CCEU-n-F

CCEU-n-F

CCEP-n-OT

CDU-n-F

CPG-n-F

TABLE D-continued

CPU-n-F

CPU-n-OXF

CGG-n-F

CGG-n-OD

CGU-n-F

PGU-n-F

GGP-n-F

GGP-n-Cl

GIGIP-n-F

TABLE D-continued

GIGIP-n-Cl

CCPU-n-F

CCGU-n-F

CPGU-n-F

CPGU-n-OT

PPGU-n-F

DPGU-n-F

CCZU-n-F

TABLE D-continued

PUZU-n-F

CCQG-n-F

CCQU-n-F

ACQU-n-F

PUQU-n-F

CDUQU-n-F

CPUQU-n-F

CGUQU-n-F

TABLE D-continued

PGUQU-n-F

PGUQU(1)-n-F

APUQU-n-F

APUQU(1)-n-F

DPUQU-n-F

DGUQU-n-F

CPU—n-F

TABLE D-continued

DAUQU-n-F

CLUQU-n-F

ALUQU-n-F

DLUQU-n-F

LGPQU-n-F

CC-n-m

CC-n-Om

CC—n-V

CC-n-Vm

CC—n-IV

TABLE D-continued $C_nH_{2n+1}$ —⟨cyclohexyl⟩—⟨cyclohexyl⟩—$(CH_2)_l$—$CH$=$CH$—$C_mH_{2m+1}$ CC-n-IVm $H_2C$=$CH$—⟨cyclohexyl⟩—⟨cyclohexyl⟩—$CH$=$CH_2$

CC—V—V $CH_2$=$CH$—⟨cyclohexyl⟩—⟨cyclohexyl⟩—$(CH_2)_l$—$CH$=$CH_2$

CC—V—IV $CH_2$=$CH$—⟨cyclohexyl⟩—⟨cyclohexyl⟩—$CH$=$CH$—$C_mH_{2m+1}$

CC—V-Vm $CH_2$=$CH$—$(CH_2)_k$—⟨cyclohexyl⟩—⟨cyclohexyl⟩—$(CH_2)_l$—$CH$=$CH_2$

CC-Vk-IV $C_nH_{2n+1}$—$CH$=$CH$—⟨cyclohexyl⟩—⟨cyclohexyl⟩—$(CH_2)_l$—$CH$=$CH_2$ CC-nV-IV $C_nH_{2n+1}$—$CH$=$CH$—⟨cyclohexyl⟩—⟨cyclohexyl⟩—$CH$=$CH$—$C_mH_{2m+1}$ CC-nV-Vm $C_nH_{2n+1}$—⟨cyclohexyl⟩—⟨cyclohexyl⟩—$CH$=$CH$—$CH$=$CH_2$ CC—n-VV $C_nH_{2n+1}$—⟨cyclohexyl⟩—⟨cyclohexyl⟩—$CH$=$CH$—$CH$=$CH$—$C_mH_{2m+1}$ CC-n-VVm $C_nH_{2n+1}$—⟨cyclohexyl⟩—$CH$=$CH$—⟨cyclohexyl⟩—$CH$=$CH_2$ CVC—n-V $C_nH_{2n+1}$—⟨cyclohexyl⟩—$CH$=$CH$—⟨cyclohexyl⟩—$CH$=$CH$—$C_mH_{2m+1}$ CVC-n-Vm $C_nH_{2n+1}$—⟨cyclohexyl⟩—⟨phenyl⟩—$C_mH_{2m+1}$ CP-n-m $C_nH_{2n+1}$—⟨cyclohexyl⟩—⟨phenyl⟩—$O$—$C_mH_{2m+1}$ CP-n-Om TABLE D-continued $C_nH_{2n+1}$ — PP-n-m — $C_mH_{2m+1}$ PP-n-m $C_nH_{2n+1}$ — PP-n-Om — $O$—$C_mH_{2m+1}$ PP-n-Om $C_nH_{2n+1}$ — CCP-n-m — $C_mH_{2m+1}$ CCP-n-m $C_nH_{2n+1}$ — CCP-n-Om — $OC_mH_{2m+1}$ CCP-n-Om $H_2C$=$CH$ — CCP—V-m — $C_mH_{2m+1}$ CCP—V-m $C_nH_{2n+1}$—$CH$=$CH$ — CCP-nV-m — $C_mH_{2m+1}$ CCP-nV-m $CH_2$=$CH$—$(CH_2)_l$ — CCP—VI-m — $C_mH_{2m+1}$ CCP—VI-m $C_nH_{2n+1}$—$CH$=$CH$—$(CH_2)_l$ — CCP-nVI-m — $C_mH_{2m+1}$ CCP-nVI-m $C_nH_{2n+1}$ — CCOC-n-m — $CH_2$—$O$ — $C_mH_{2m+1}$ CCOC-n-m $C_nH_{2n+1}$ — CCVC-n-m — $C_mH_{2m+1}$ CCVC-n-m $C_nH_{2n+1}$ — CCVC—n-V — $CH$=$CH_2$ CCVC—n-V $C_nH_{2n+1}$ — CCVC—n-IV — $(CH_2$—$)_l CH$=$CH_2$ CCVC—n-IV $C_nH_{2n+1}$ — CLP-n-m — $C_mH_{2m+1}$ CLP-n-m TABLE D-continued $H_2C\!\!=\!\!CH$ — cyclohexyl — cyclohexenyl — phenyl — $C_nH_{2n+1}$ CLP-V-n $C_nH_{2n+1}$ — cyclohexyl — phenyl — phenyl — $C_mH_{2m+1}$ CPP-n-m $C_nH_{2n+1}$ — cyclohexyl — phenyl — phenyl(F) — $C_mH_{2m+1}$ CPG-n-m $C_nH_{2n+1}$ — cyclohexyl — phenyl(F) — phenyl — $C_mH_{2m+1}$ CGP-n-m $C_nH_{2n+1}$ — phenyl — phenyl(F) — phenyl — $C_mH_{2m+1}$ PGP-n-m $C_nH_{2n+1}$ — phenyl — phenyl(F) — phenyl — $(CH_2)_l$ — $CH\!\!=\!\!CH_2$ PGP-n-IV $C_nH_{2n+1}$ — phenyl — phenyl(F) — phenyl — $(CH_2)_l$ — $CH\!\!=\!\!CH$ — $C_mH_{2m+1}$ PGP-n-IVm $C_nH_{2n+1}$ — cyclohexyl — cyclohexyl — $CO$ — $O$ — phenyl — cyclohexyl — $O$ — $C_mH_{2m+1}$ CCZPC-n-m $C_nH_{2n+1}$ — cyclohexyl — phenyl — phenyl — cyclohexyl — $C_mH_{2m+1}$ CPPC-n-m $C_nH_{2n+1}$ — cyclohexyl — phenyl(F) — phenyl — cyclohexyl — $C_mH_{2m+1}$ CGPC-n-m $C_nH_{2n+1}$ — cyclohexyl — phenyl — phenyl(F) — phenyl — $C_mH_{2m+1}$ CPGP-n-m TABLE D-continued $CH_2{=}CH$ — ⬡ — ⬡ — $C_nH_{2n+1}$ CY—V-n $CH_2{=}CH$ — ⬡ — ⬡ — $O{-}C_nH_{2n+1}$ CY—V-On $C_nH_{2n+1}{-}CH{=}CH$ — ⬡ — ⬡ — $C_mH_{2m+1}$ CY-nV-m $C_nH_{2n+1}{-}CH{=}CH$ — ⬡ — ⬡ — $O{-}C_mH_{2m+1}$ CY-nV-Om $CH_2{=}CH({-}CH_2)_{2l}$ — ⬡ — ⬡ — $C_mH_{2m+1}$ CY—VI-m $CH_2{=}CH({-}CH_2)_{2l}$ — ⬡ — ⬡ — $O{-}C_mH_{2m+1}$ CY—VI-Om $C_nH_{2n+1}{-}CH{=}CH{-}(CH_2)_l$ — ⬡ — ⬡ — $C_mH_{2m+1}$ CY-nVI-m $C_nH_{2n+1}{-}CH{=}CH{-}(CH_2)_l$ — ⬡ — ⬡ — $O{-}C_mH_{2m+1}$ CY-nVI-Om $CH_2{=}CH$ — ⬡ — ⬡ — $C_nH_{2n+1}$ PY—V-n $CH_2{=}CH$ — ⬡ — ⬡ — $O{-}C_nH_{2n+1}$ PY—V-On TABLE D-continued $C_nH_{2n+1}$—CH=CH— ... —$C_mH_{2m+1}$ PY-nV-m $C_nH_{2n+1}$—CH=CH— ... O—$C_mH_{2m+1}$ PY-nV-Om $CH_2$=CH(—$CH_2$)$_l$— ... —$C_mH_{2m+1}$ PY—Vl-m $CH_2$=CH(—$CH_2$)$_l$— ... O—$C_mH_{2m+1}$ PY—Vl-Om $C_nH_{2n+1}$—CH=CH—($CH_2$)$_{2l}$— ... —$C_mH_{2m+1}$ PY-nVl-m $C_nH_{2n+1}$—CH=CH—($CH_2$)$_l$— ... O—$C_mH_{2m+1}$ PY-nVl-Om $CH_2$=CH— ... —$C_nH_{2n+1}$ CCY—V-n $CH_2$=CH— ... O—$C_nH_{2n+1}$ CCY—V-On $C_nH_{2n+1}$—CH=CH— ... —$C_mH_{2m+1}$ CCY-nV-m $C_nH_{2n+1}$—CH=CH— ... O—$C_mH_{2m+1}$ CCY-nV-Om TABLE D-continued $CH_2=CH(-CH_2)_l$ — ⬡—⬡— (F,F benzene) —$C_mH_{2m+1}$ CCY—VI-m $CH_2=CH(-CH_2)_l$ — ⬡—⬡— (F,F benzene) —$O-C_mH_{2m+1}$ CCY—VI-Om $C_nH_{2n+1}$—$CH=CH-(CH_2)_l$ — ⬡—⬡— (F,F benzene) —$C_mH_{2m+1}$ CCY-nVI-m $C_nH_{2n+1}$—$CH=CH-(CH_2)_l$ — ⬡—⬡— (F,F benzene) —$O-C_mH_{2m+1}$ CCY-nVI-Om $CH_2=CH$ — ⬡—⬡— (F,F benzene) —$C_nH_{2n+1}$ CPY—V-n $CH_2=CH$ — ⬡—⬡— (F,F benzene) —$O-C_nH_{2n+1}$ CPY—V-On $C_nH_{2n+1}$—$CH=CH$ — ⬡—⬡— (F,F benzene) —$C_mH_{2m+1}$ CPY-nV-m $C_nH_{2n+1}$—$CH=CH$ — ⬡—⬡— (F,F benzene) —$O-C_mH_{2m+1}$ CPY-nV-Om $CH_2=CH(-CH_2)_l$ — ⬡—⬡— (F,F benzene) —$C_mH_{2m+1}$ CPY—VI-m $CH_2=CH(-CH_2)_l$ — ⬡—⬡— (F,F benzene) —$O-C_mH_{2m+1}$ CPY—VI-Om TABLE D-continued $C_nH_{2n+1}$—CH=CH—$(CH_2)_l$ CPY-nVI-k $C_nH_{2n+1}$—CH=CH—$(CH_2)_l$ CPY-nVI-Om $C_nH_{2n+1}$ CY-n-m $C_nH_{2n+1}$ CY-n-Om $C_nH_{2n+1}$ CVY-n-m $CH_2$=CH CVY—V-n $C_nH_{2n+1}$ CZY-n-Om $C_nH_{2n+1}$ COY-n-m $C_nH_{2n+1}$ COY-n-Om $C_nH_{2n+1}$ Y-n-m TABLE D-continued $C_nH_{2n+1}$ ... $O$ — $C_mH_{2m+1}$ Y-n-Om $C_nH_{2n+1}$ — $O$ ... $O$ — $C_mH_{2m+1}$ Y-nO-Om $C_nH_{2n+1}$ ... $C_mH_{2m+1}$ PY-n-m $C_nH_{2n+1}$ ... $O$ — $C_mH_{2m+1}$ PY-n-Om $C_nH_{2n+1}$ ... $C_mH_{2m+1}$ CCY-n-m $C_nH_{2n+1}$ ... $O$ — $C_mH_{2m+1}$ CCY-n-Om $C_nH_{2n+1}$ ... $(CH_2)_m$ — $O$ — $C_lH_{2l+1}$ CCY-n-mOl $C_nH_{2n+1}$ ... $CO$ — $O$ ... $O$ — $C_mH_{2m+1}$ CCZY-n-Om $C_nH_{2n+1}$ ... $CH_2$ — $O$ ... $C_mH_{2m+1}$ CCOY-n-m $C_nH_{2n+1}$ ... $CH_2$ — $O$ ... $O$ — $C_mH_{2m+1}$ CCOY-n-Om TABLE D-continued CLOY-n-Om CLOY(1)-n-Om CPY-n-m CPY-n-Om PYP-n-m PYP-n-V PYP-n-IV PYP-n-Vm PYP-n-IVm PYP-n-(c5)

TABLE D-continued

PYP-n-m(c3)

CP(F,Cl)-n-Om

CLY-n-m

CLY-n-Om

AILOY-n-Om

CK—n-F

B-n-m

B-n-IV

B-Vn-IV

TABLE D-continued $C_nH_{2n+1}$ — ... — O — $C_mH_{2m+1}$

B-n-Om $C_nH_{2n+1}$ — O — ... — O — $C_nH_{2m+1}$

B-nO-Om $C_nH_{2n+1}$ — ... — O — $C_mH_{2m+1}$

CB-n-Om $C_nH_{2n+1}$ — ... — O — $C_mH_{2m+1}$

PB-n-Om $C_nH_{2n+1}$ — O — ... — O — $C_mH_{2m+1}$

B(S)-nO-Om $H_{2n+1}C_n$ — ... — O — ... — $OC_mH_{2m+1}$

COB(S)-n-Om $(CH_2)_n$ — O — ... — $OC_mH_{2m+1}$

B(S)-(c3)nO-Om $(CH_2)_n$ — O — ... — $OC_mH_{2m+1}$

B(S)-(c5)nO-Om $(CH_2)_n$ — O — ... — $O(CH_2)_m$

B(S)-(c5)nO-Om(c3)

$(CH_2)_l$ — O — ... — $O(CH_2)_m$ — $(CH_2)_nH$

B(S)-(c5)lO-OmVn

TABLE D-continued

COB(S)-n-Om(c5)

LY-(c5)-Om

B(S)-(c5-3en)nO-Om

LB(S)-n-F

LB(S)-n-OT

B(P)-n-m

B(P)-n-Om

B(P)-n-Om

B(P)-nO-Om

B(P)-(c5)nO-Om

TABLE D-continued

B(A)-nO-Om

In a preferred embodiment of the present invention, the media comprise one or more compounds selected from the group of the compounds of Table D.

Table E shows chiral dopants which are preferably employed in the mixtures according to the invention.

TABLE E

C 15

CB 15

CM 21

CM 44

CM 45

CM 47

CC

TABLE E-continued

CN

R/S-811

R/S-1011

R/S-2011

R/S-3011

R/S-4011

R/S-5011

US 12,612,551 B2

167
168

Preferably, the media according to the invention comprise one or more compounds selected from the group of the compounds from Table E.

Table F

Table F shows illustrative reactive mesogenic compounds (RM) which can be used in the LC media in accordance with the present invention.

RM-1

RM-2

RM-3

RM-4

RM-5

RM-6

RM-7

-continued

RM-8

RM-9

RM-10

RM-11

RM-12

RM-13

RM-14

-continued

RM-15

RM-16

RM-17

RM-18

RM-19

RM-20

RM-21

RM-22

-continued

RM-23

RM-24

RM-25

RM-26

RM-27

RM-28

RM-29

-continued

RM-30

RM-31

RM-32

RM-33

RM-34

RM-35

RM-36

RM-37

-continued

RM-38

RM-39

RM-40

RM-41

RM-42

RM-43

RM-44

-continued

RM-45

RM-46

RM-47

RM-48

RM-49

RM-50

RM-51

-continued

RM-52

RM-53

RM-54

RM-55

RM-56

RM-57

RM-58

-continued

RM-59

RM-60

RM-61

RM-62

RM-63

RM-64

RM-65

-continued

RM-66

RM-67

RM-68

RM-69

RM-70

RM-71

RM-72

RM-73

-continued

RM-74

RM-75

RM-76

RM-77

RM-78

RM-79

RM-80

RM-81

-continued

RM-82

RM-83

RM-84

RM-85

RM-86

RM-87

-continued

RM-88

RM-89

RM-90

RM-91

-continued

RM-92

RM-93

RM-94

RM-95

RM-96

RM-97

-continued

RM-98

RM-99

RM-100

RM-101

RM-102

-continued

RM-103

RM-104

RM-105

-continued

RM-106

RM-107

RM-108

RM-109

-continued

RM-110

RM-111

RM-112

RM-113

RM-114

-continued

RM-115

RM-116

RM-117

RM-118

-continued

RM-119

RM-120

RM-121

RM-122

RM-123

-continued

RM-124

RM-125

RM-126

RM-127

-continued

RM-128

RM-129

RM-130

RM-131

RM-132

RM-133

RM-134

RM-135

RM-136

-continued

RM-137

RM-138

RM-139

RM-140

-continued

RM-141

RM-142

RM-143

RM-144

RM-145

-continued

RM-146

RM-147

RM-148

RM-149

RM-150

RM-151

-continued

RM-152

RM-153

RM-154

RM-155

RM-156

RM-157

RM-158

-continued

RM-159

RM-160

RM-161

RM-162

RM-163

RM-164

-continued

RM-165

RM-166

RM-167

RM-168

RM-169

RM-170

RM-171

-continued

RM-172

RM-173

RM-174

RM-175

RM-176

RM-177

-continued

RM-178

RM-179

RM-180

RM-181

RM-182

RM-183

In a preferred embodiment, the mixtures according to the invention comprise one or more polymerizable compounds, preferably selected from the polymerizable compounds of the formulae RM-1 to RM-182. Of these, compounds RM-1, RM-4, RM-8, RM-17, RM-19, RM-35, RM-37, RM-39, RM-40, RM-41, RM-48, RM-52, RM-54, RM-57, RM-58, RM-64, RM-74, RM-76, RM-88, RM-91, RM-102, RM-103, RM-109, RM-116, RM-117, RM-120, RM-121, RM-122, RM-139, RM-140, RM-142, RM-143, RM-145, RM-146, RM-147, RM-149, RM-156 to RM-163, RM-169, RM-170 and RM-171 to RM-183 are particularly preferred.

Working Examples

The following examples are intended to explain the invention without limiting it. In the examples, m.p. denotes the melting point and $T_{(N,I)}$ denotes the clearing point of a liquid-crystalline substance in degrees Celsius; Furthermore: C denotes crystalline solid state, S denotes smectic phase (the index denotes the phase type), N denotes nematic state, Ch denotes cholesteric phase, I denotes isotropic phase, $T_g$ denotes glass-transition temperature. The number between two symbols indicates the conversion temperature in degrees Celsius.

The host mixture used for determination of the optical anisotropy $\Delta n$ of single compounds is the commercial mixture ZLI-4792 (Merck KGaA). The dielectric anisotropy $\Delta\varepsilon$ is determined using commercial mixture ZLI-2857. The physical data of the compound to be investigated are obtained from the change in the dielectric constants of the host mixture after addition of the compound to be investigated and extrapolation to 100% of the compound employed. In general, 10% of the compound to be investigated are dissolved in the host mixture, depending on the solubility.

Unless indicated otherwise, parts or percent data denote parts by weight or percent by weight.

Above and below:

V$_o$ denotes threshold voltage, capacitive [V] at 20° C., n$_e$ denotes extraordinary refractive index at 20° C. and 589 nm, n$_o$ denotes ordinary refractive index at 20° C. and 589 nm, $\Delta n$ denotes optical anisotropy (birefringence) at 20° C. and 589 nm, $\varepsilon_\perp$ denotes dielectric permittivity perpendicular to the director at 20° C. and 1 kHz, $\varepsilon\parallel$ denotes dielectric permittivity parallel to the director at 20° C. and 1 kHz, $\Delta\varepsilon$ denotes dielectric anisotropy at 20° C. and 1 kHz, cl.p., T(N,l) denotes clearing point [° C.], $\gamma_1$ denotes rotational viscosity measured at 20° C. [mPa·s], K$_1$ denotes elastic constant, "splay" deformation at 20° C. [pN], K$_2$ denotes elastic constant, "twist" deformation at 20° C. [pN], K$_3$ denotes elastic constant, "bend" deformation at 20° C. [pN], K$_{av}$ denotes the average elastic constant defined as K$_{av}$=⅓(1.5K$_1$+K$_3$) at 20° C. [pN], and LTS denotes low-temperature stability (nematic phase), determined in test cells or in the bulk, as specified.

Unless explicitly noted otherwise, all values indicated in the present application for temperatures, such as, for example, the melting point T(C,N), the transition from the smectic (S) to the nematic (N) phase T(S,N) and the clearing point T(N,l) or cl.p., are indicated in degrees Celsius (° C.).

The term "threshold voltage" for the present invention relates to the capacitive threshold (V$_0$), also called the Freedericksz threshold, unless explicitly indicated otherwise. In the examples, as is generally usual, the optical threshold can also be indicated for 10% relative contrast (V$_{10}$).

The display used for measurement of the capacitive threshold voltage consists of two plane-parallel glass outer plates at a separation of 20 μm, which each have on the insides an electrode layer and an unrubbed polyimide alignment layer on top, which cause a homeotropic edge alignment of the liquid-crystal molecules.

The display or test cell used for measurement of the tilt angle consists of two plane-parallel glass outer plates at a separation of 4 μm, which each have on the insides an electrode layer and a polyimide alignment layer on top, where the two polyimide layers are rubbed antiparallel to one another and cause a homeotropic edge alignment of the liquid-crystal molecules.

The polymerisable compounds are polymerised in the display or test cell by irradiation with UV light of defined intensity for a prespecified time, with a voltage simultaneously being applied to the display (usually 10 V to 30 V alternating current, 1 kHz). In the examples, unless indicated otherwise, a metal halide lamp and an intensity of 100 mW/cm² is used for polymerisation. The intensity is measured using a standard meter (Hoenle UV-meter high end with UV sensor).

The tilt angle is determined using the Mueller Matrix Polarimeter "AxoScan" from Axometrics. A low value (i.e. a large deviation from the 90° angle) corresponds to a large tilt here.

Unless stated otherwise, the term "tilt angle" means the angle between the LC director and the substrate, and "LC director" means in a layer of LC molecules with uniform orientation the preferred orientation direction of the optical main axis of the LC molecules, which corresponds, in case of calamitic, uniaxially positive birefringent LC molecules, to their molecular long axis.

Unless indicated otherwise, the VHR is determined at 20° C. (VHR$_{20}$) and after 5 minutes in an oven at 100° C. (VHR$_{100}$) in a commercially available instrument Model LCM-1 (00004) from TOYO Corporation, Japan. The voltage used has a frequency of in a range from 1 Hz to 60 Hz, unless indicated more precisely.

The stability to UV irradiation is investigated in a "Suntest CPS+", a commercial instrument from Heraeus, Germany, using a Xenon lamp NXE1500B. The sealed test cells are irradiated for 2.0 h, unless explicitly indicated, without additional heating. The irradiation power in the wavelength range from 300 nm to 800 nm is 765 W/m² V. A UV "cut-off" filter having an edge wavelength of 310 nm is used in order to simulate the so-called window glass mode. In each series of experiments, at least four test cells are investigated for each condition, and the respective results are indicated as averages of the corresponding individual measurements.

The decrease in the voltage holding ratio ($\Delta$VHR) usually caused by the exposure, for example by UV irradiation or by LCD backlighting, is determined in accordance with the following equation (1):

$$\Delta VHR(t) = VHR(t) - VHR(t = 0). \tag{1}$$

In order to investigate the low-temperature stability, also known as "LTS", i.e. the stability of the LC mixture in the bulk against spontaneous crystallisation of individual components at low temperatures or the occurrence of smectic phases, as the case may be, several sealed bottles, each containing about 1 g of the material, are stored at one or more given temperatures, typically of −10° C., −20° C., −30° C. and/or −40° C. and it is inspected at regular intervals visually, whether a phase transition is observed or not. As soon as the first one of the samples at a given temperature shows a change the test is discontinued and the time until the last inspection, at which no change has been observed, is noted as the respective LTS. The test is run for 1000 h. If after 1000 h no change has occurred, the result is "LTS>1000 h" The ion density from which the resistivity is calculated is measured using the commercially available LC Material Characteristics Measurement System Model 6254 from Toyo Corporation, Japan, using VHR test cells with AL16301 Polyimide (JSR Corp., Japan) having a 3.2 μm cell gap. The measurement is performed after 5 min of storage in an oven at 60° C. or 100° C.

The so-called "HTP" denotes the helical twisting power of an optically active or chiral substance in an LC medium (in μm). Unless indicated otherwise, the HTP is measured in the commercially available nematic LC host mixture MLD-6260 (Merck KGaA) at a temperature of 20° C.

The Clearing point is measured using the Mettler Thermosystem FP900. The optical anisotropy ($\Delta n$) is measured using an Abbe-Refraktometer $H_{005}$ (Natrium-spectral lamp Na10 at 589 nm, 20° C.). The dielectric anisotropy ($\Delta \varepsilon$) is measured using an LCR-Meter E4980A/Agilent (G005) at 20° C. ($\varepsilon$-parallel-cells with JALS 2096-R$^1$). The turn on voltage ($V_0$) is measured using an LCR-Meter E4980A/Agilent (G005) at 20° C. ($\varepsilon$-parallel-cells with JALS 2096-R$^1$). The rotational viscosity ($\gamma_1$) is measured using a TOYO LCM-2 (0002) at 20° C. (gamma 1 negative cells with JALS-2096-R1). The elastic constant ($K_1$, splay) is measured using an LCR-Meter E4980A/Agilent (G005) at 20° C. ($\varepsilon$ parallel-cells with JALS 2096-R1). $K_3$: The elastic constant ($K_3$, bend) is measured using an LCR-Meter E4980A/Agilent (G005) at 20° C. ($\varepsilon$-parallel-cells with JALS 2096-R1).

Unless explicitly noted otherwise, all concentrations in the present application are indicated in percent by weight and relate to the corresponding mixture as a whole, comprising all solid or liquid-crystalline components, without solvents. All physical properties are determined in accordance with "Merck Liquid Crystals, Physical Properties of Liquid Crystals", Status November 1997, Merck KGaA, Germany, and apply for a temperature of 20° C., unless explicitly indicated otherwise.

The following mixture examples having positive dielectric anisotropy are suitable, in particular, for liquid-crystal displays which have at least one planar alignment layer, such as, for example, IPS and FFS displays, in particular UB-FFS (=ultra-bright FFS), and for VA displays.

EXAMPLES

The composition and physical properties of comparative Mixture C-1 and the nematic mixtures M-1 to M-12 are given in the following tables. The composition is given in percent by weight.

Comparative Example C1

| APUQU-3-F | 3.0 | cl. p. [° C.]: | 104.5 |
| CC-3-2V1 | 2.0 | $\Delta n$ [589 nm, 20° C.]: | 0.0920 |
| CC-3-V | 37.75 | $\Delta \varepsilon$ [1 kHz, 20° C.]: | 3.1 |
| CC-3-V1 | 6.0 | $\gamma_1$ [mPa s, 20° C.]: | 89 |
| CCP-V-1 | 5.0 | $K_1$ [pN, 20° C.]: | 17.9 |
| CCP-V2-1 | 12.0 | $K_3$ [pN, 20° C.]: | 21.1 |
| CCPC-33 | 3.0 | | |
| CCVC-3-V | 1.75 | | |
| CDUQU-3-F | 8.0 | | |
| CLP-V-1 | 8.0 | | |
| CLY-3-O2 | 5.0 | | |
| DGUQU-4-F | 1.5 | | |
| LB(S)-3-OT | 2.0 | | |
| CP-3-O2 | 1.0 | | |
| PP-1-2V1 | 4.0 | | |
| $\Sigma$ | 100.0 | | |

Mixture Example M1

| APUQU-3-F | 3.0 | cl. p. [° C.]: | 104.3 |
| CC-3-2V1 | 2.0 | $\Delta n$ [589 nm, 20° C.]: | 0.0925 |
| CC-3-V | 37.75 | $\Delta \varepsilon$ [1 kHz, 20° C.]: | 3.2 |
| CC-3-V1 | 6.0 | $\gamma_1$ [mPa s, 20° C.]: | 87 |
| CCP-V-1 | 5.0 | $K_1$ [pN, 20° C.]: | 18.2 |
| CCP-V2-1 | 12.0 | $K_3$ [pN, 20° C.]: | 20.7 |
| CCVC-3-V | 1.75 | LTS bulk [h, −40° C.]: | 1000 |
| CDUQU-3-F | 8.0 | | |
| CLP-V-1 | 8.0 | | |
| CLPC-3-2 | 3.0 | | |
| CLY-3-O2 | 5.0 | | |
| DGUQU-4-F | 1.5 | | |
| LB(S)-3-OT | 2.0 | | |
| CP-3-O2 | 1.0 | | |
| PP-1-2V1 | 4.0 | | |
| $\Sigma$ | 100.0 | | |

In the following table, key parameters of the mixtures C1 and M1 are summarized.

| | $\Delta \varepsilon$ | $\Delta n$ | $K_{av}$ [pN] | $\gamma_1$ [mPas] | $\gamma_1/K_1$ [mPas/pN] |
|---|---|---|---|---|---|
| C1 | 3.1 | 0.0920 | 16.0 | 89 | 5.0 |
| M1 | 3.2 | 0.0925 | 16.0 | 87 | 4.8 |

It is surprisingly found that the replacement of the compounds CCPC-3-3 of Comparative Mixture C1 with the compound CLPC-2-3 of the formula I in Mixture Example 1, a favorably lower rotational viscosity ($\gamma_1$) and at the same time a lower ratio $\gamma_1/K_1$ can be achieved, which improves the response time of a display.

Mixture Example M2

| CC-3-V | 34.0 | cl. p. [° C.]: | 107 |
| CC-3-V1 | 6.5 | $\Delta n$ [589 nm, 20° C.]: | 0.1215 |
| CCP-V-1 | 15.0 | $\Delta \varepsilon$ [1 kHz, 20° C.]: | 3.8 |
| CCP-V2-1 | 4.0 | $\gamma_1$ [mPa s, 20° C.]: | 84 |
| CCVC-3-V | 3.0 | $K_1$ [pN, 20° C.]: | 17.7 |
| CDUQU-3-F | 3.7 | $K_3$ [pN, 20° C.]: | 18.5 |
| CLP-V-1 | 4.5 | | |
| CLPC-3-2 | 3.0 | | |
| CPGP-4-3 | 1.0 | | |

-continued

| DGUQU-4-F | 4.0 |
| PGP-2-2V | 5.0 |
| PGUQU-3-F | 4.3 |
| PP-1-2V1 | 1.5 |
| PPGU-3-F | 0.5 |
| PUS-3-2 | 10.0 |
| Σ | 100.0 |

Mixture Example M3

| CGPC-5-3 | 1.0 | cl. p. [° C.]: | 119.6 |
| CC-3-V | 27.75 | Δn [589 nm, 20° C.]: | 0.1302 |
| CC-3-V1 | 6.25 | Δε [1 kHz, 20° C.]: | 4.2 |
| CCP-V-1 | 15.0 | $\gamma_1$ [mPa s, 20° C.]: | 103 |
| CCP-V2-1 | 10.0 | $K_1$ [pN, 20° C.]: | 19.1 |
| CCVC-3-V | 4.25 | $K_3$ [pN, 20° C.]: | 19.6 |
| CDUQU-3-F | 2.25 | LTS bulk [h, −40° C.]: | 1000 |
| CLPC-3-2 | 3.0 | | |
| CPGP-4-3 | 2.5 | | |
| DGUQU-4-F | 4.0 | | |
| CP-3-O2 | 0.5 | | |
| PGP-2-2V | 4.0 | | |
| PGUQU-3-F | 4.5 | | |
| PGUQU-4-F | 2.0 | | |
| PPGU-3-F | 0.5 | | |
| PUS-3-2 | 12.5 | | |
| Σ | 100.0 | | |

Mixture Example M4

| CC-3-V | 33.0 | cl. p. [° C.]: | 103.8 |
| CC-3-V1 | 6.0 | Δn [589 nm, 20° C.]: | 0.1140 |
| CC-4-V1 | 4.0 | Δε [1 kHz, 20° C.]: | 4.0 |
| CCGU-3-F | 0.75 | $\gamma_1$ [mPa s, 20° C.]: | 87 |
| CCP-V-1 | 13.5 | $K_1$ [pN, 20° C.]: | 17.4 |
| CCP-V2-1 | 4.0 | $K_3$ [pN, 20° C.]: | 18.6 |
| CDUQU-3-F | 3.0 | | |
| CLP-V-1 | 5.0 | | |
| CLPC-3-2 | 4.0 | | |
| DGUQU-4-F | 2.75 | | |
| LB(S)-3-OT | 5.0 | | |
| CP-3-O2 | 1.0 | | |
| PGP-2-2V | 7.5 | | |
| PGUQU-3-F | 4.0 | | |
| PGUQU-4-F | 3.0 | | |
| PP-1-2V1 | 3.0 | | |
| PPGU-3-F | 0.5 | | |
| Σ | 100.0 | | |

Mixture Example M5

| APUQU-3-F | 3.0 | cl. p. [° C.]: | 104.5 |
| CC-3-2V1 | 2.0 | Δn [589 nm, 20° C.]: | 0.0924 |
| CC-3-V | 37.75 | Δε [1 kHz, 20° C.]: | 3.2 |
| CC-3-V1 | 6.0 | $\gamma_1$ [mPa s, 20° C.]: | 86 |
| CCP-V-1 | 5.0 | $K_1$ [pN, 20° C.]: | 18.0 |
| CCP-V2-1 | 12.0 | $K_3$ [pN, 20° C.]: | 20.2 |
| CCC-3-V | 1.75 | | |
| CDUQU-3-F | 8.0 | | |

-continued

| CLP-V-1 | 8.0 |
| CLPC-3-2 | 3.0 |
| CLY-3-O2 | 5.0 |
| DGUQU-4-F | 1.5 |
| LB(S)-3-OT | 2.0 |
| CP-3-O2 | 1.0 |
| PP-1-2V1 | 4.0 |
| Σ | 100.0 |

Mixture Example M6

| APUQU-3-F | 3.0 | cl. p. [° C.]: | 101 |
| CC-3-2V1 | 3.5 | Δn [589 nm, 20° C.]: | 0.0899 |
| CC-3-V | 37.75 | Δε [1 kHz, 20° C.]: | 3.2 |
| CC-3-V1 | 6.0 | $\gamma_1$ [mPa s, 20° C.]: | 84 |
| CCP-V-1 | 5.0 | $K_1$ [pN, 20° C.]: | 17.8 |
| CCP-V2-1 | 13.0 | $K_3$ [pN, 20° C.]: | 20.5 |
| CCVC-3-V | 1.75 | | |
| CDUQU-3-F | 8.0 | | |
| CLP-V-1 | 8.0 | | |
| CLPC-3-2 | 3.0 | | |
| CLOY-3-O2 | 2.5 | | |
| DGUQU-4-F | 1.5 | | |
| LB(S)-3-OT | 2.0 | | |
| CP-3-O2 | 1.0 | | |
| PP-1-2V1 | 4.0 | | |
| Σ | 100.0 | | |

Mixture M7

Mixture M28 consists of 99.975% of Mixture M1 and 250 ppm of the stabiliser ST-3c

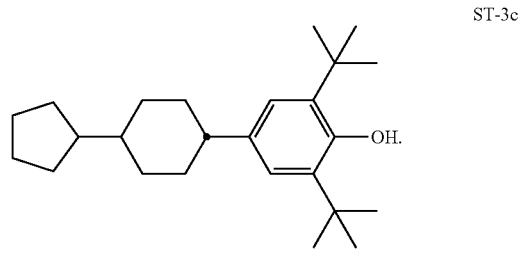

ST-3c

Mixture M8

Mixture M29 consists of 99.975% of Mixture M2, 150 ppm of Stabiliser ST-3d and 100 ppm of stabiliser ST-19a ST-3d ST-19a

-continued

| | |
|---|---|
| CLPC-3-2 | 4.0 |
| DGUQU-4-F | 2.75 |
| LB(S)-3-OT | 3.0 |
| B(S)-5-F | 2.0 |
| CP-3-O2 | 1.0 |
| PGP-2-2V | 7.5 |
| PGUQU-3-F | 4.0 |
| PGUQU-4-F | 3.0 |
| PP-1-2V1 | 3.0 |
| PPGU-3-F | 0.5 |
| Σ | 100.0 |

Mixture Example M9

| | | | |
|---|---|---|---|
| CGPC-5-3 | 1.0 | cl. p. [° C.]: | 119 |
| CC-3-V | 27.75 | Δn [589 nm, 20° C.]: | 0.1288 |
| CC-3-V1 | 6.25 | Δε [1 kHz, 20° C.]: | 4.2 |
| CCP-V-1 | 15.0 | γ₁ [mPa s, 20° C.]: | 106 |
| CCP-V2-1 | 10.0 | K₁ [pN, 20° C.]: | 19.0 |
| CCVC-3-V | 4.25 | K₃ [pN, 20° C.]: | 20.0 |
| CDUQU-3-F | 2.25 | LTS bulk [h, −40° C.]: | 1000 |
| CLPC-3-2 | 3.0 | | |
| CPGP-4-3 | 2.5 | | |
| DGUQU-4-F | 4.0 | | |
| CP-3-O2 | 0.5 | | |
| PGP-2-2V | 4.0 | | |
| PGIGI-3-F | 2.5 | | |
| PGUQU-3-F | 4.5 | | |
| PGUQU-4-F | 2.0 | | |
| PPGU-3-F | 0.5 | | |
| PUS-3-2 | 10.0 | | |
| Σ | 100.0 | | |

Mixture Example M10

| | | | |
|---|---|---|---|
| CC-3-V | 33.0 | cl. p. [° C.]: | 101 |
| CC-3-V1 | 6.0 | Δn [589 nm, 20° C.]: | 0.1125 |
| CC-4-V1 | 4.0 | Δε [1 kHz, 20° C.]: | 3.9 |
| CCGU-3-F | 0.75 | γ₁ [mPa s, 20° C.]: | 84 |
| CCP-V-1 | 13.5 | | |
| CCP-V2-1 | 4.0 | | |
| CDUQU-3-F | 3.0 | | |
| CLP-V-1 | 5.0 | | |

Mixture Example M11

| | | | |
|---|---|---|---|
| APUQU-3-F | 3.5 | cl. p. [° C.]: | 104 |
| CC-3-2V1 | 2.0 | Δn [589 nm, 20° C.]: | 0.0920 |
| CC-3-V | 37.75 | Δε [1 kHz, 20° C.]: | 3.2 |
| CC-3-V1 | 6.0 | γ₁ [mPa s, 20° C.]: | 85 |
| CCP-V-1 | 6.0 | | |
| CCP-V2-1 | 12.0 | | |
| CCVC-3-V | 1.75 | | |
| CDUQU-3-F | 8.0 | | |
| CLP-V-1 | 8.0 | | |
| CLPC-3-2 | 3.0 | | |
| CLY-3-O2 | 4.0 | | |
| DGUQU-4-F | 1.5 | | |
| B(P)-4O-O4 | 1.5 | | |

-continued

| CP-3-O2 | 1.0 |
|---|---|
| PP-1-2V1 | 4.0 |
| Σ | 100.0 |

Mixture Example M12

| APUQU-3-F | 3.0 | cl. p. [° C.]: | 103 |
|---|---|---|---|
| CC-3-2V1 | 2.0 | Δn [589 nm, 20° C.]: | 0.0922 |
| CC-3-V | 37.75 | Δε [1 kHz, 20° C.]: | 3.1 |
| CC-3-V1 | 6.0 | $\gamma_1$ [mPa s, 20° C.]: | 86 |
| CCP-V-1 | 6.0 | $K_1$ [pN, 20° C.]: | 18.1 |
| CCP-V2-1 | 12.0 | $K_3$ [pN, 20° C.]: | 20.5 |
| CCVC-3-V | 1.75 | | |
| CDUQU-3-F | 8.0 | | |
| CLP-V-1 | 8.0 | | |
| CLPC-3-2 | 3.0 | | |
| CLY-3-O2 | 4.0 | | |
| DGUQU-4-F | 1.5 | | |
| B(S)-2O-O5 | 2.0 | | |
| CP-3-O2 | 1.0 | | |
| PP-1-2V1 | 4.0 | | |
| Σ | 100.0 | | |

The invention claimed is:

1. A liquid crystal medium comprising
a) one or more compounds of formula I

I in which
$R^{11}$ and $R^{12}$ identically or differently, denote H, straight chain alkyl or alkoxy having 1 to 15 C atoms, straight chain alkenyl or alkenyloxy having 2 to 15 C atoms or branched alkyl, alkoxy, alkenyl, alkenyloxy each having 3 to 15 C atoms, where one or more $CH_2$ groups in these radicals may each be replaced, independently of one another, by —CH=CH—, —C≡C—, —CF$_2$O—, —OCF$_2$—, —O—, —CO—O— or —O—CO— in such a way that O atoms are not linked directly to one another, and in which one or more H atoms may be replaced by halogen,
$L^{11}$ and $L^{12}$ independently denote H, F, Cl, CH$_3$, CF$_3$ or CHF$_2$; and
b) one or more compounds selected from the group of compounds of formulae II and/or III

II

III in which
$R^2$ and $R^3$,
independently of one another, denote a straight-chain alkyl or alkoxy radical that is unsubstituted or halogenated and has 1 to 15 C atoms, or a branched alkyl or alkoxy radical that is unsubstituted or halogenated and has 3 to 15 C atoms, where one or more $CH_2$ groups in these radicals may each be replaced, independently of one another, by —C≡C—, —CF$_2$O—, —CH=CH—, —O—, —CO—O— or —O—CO— in such a way that O atoms are not linked directly to one another, independently of one another denote 239
-continued

240 in which

L²³ and L²⁴ denote H or F,

R² independently of one another, denote a straight-chain alkyl or alkoxy radical that is unsubstituted or halogenated and has 1 to 15 C atoms, or a branched alkyl or alkoxy radical that is unsubstituted or halogenated and has 3 to 15 C atoms, where one or more $CH_2$ groups in these radicals may each be replaced, independently of one another, by —C≡C—, —CF₂O—, —CH=CH—, —O—, —CO—O— or —O—CO— in such a way that O atoms are not linked directly to one another, and independently of one another denote $L^{21}$, $L^{22}$, $L^{31}$ and $L^{32}$
   independently of each other, denote H or F, $Y^2$ and $Y^3$ identically or differently, denote H or $CH_3$, $X^2$ and $X^3$ independently of each other, denote halogen, halogenated alkyl or halogenated alkoxy with 1 to 3 C-atoms or halogenated alkenyl or halogenated alkenyloxy with 2 or 3 C-atoms, $Z^3$ denotes —CH₂CH₂—, —CF₂CF₂—, —COO—, trans-CH=CH—, trans-CF=CF—, —CH₂O— or a single bond, and l, m, n and o are, independently of each other, 0 or 1.

2. The medium according to claim 1, wherein $L^{11}$ and $L^{12}$ independently denote H or F.

3. The liquid crystal medium according to claim 1, wherein the one or more compounds of formula II are selected from the compounds of formulae II-1, II-2 and/or II-3

II-1

II-2

II-3

$L^{21}$ and $L^{22}$, independently of each other, denote H or F, and $X^2$ independently of each other, denote halogen, halogenated alkyl or halogenated alkoxy with 1 to 3 C-atoms or halogenated alkenyl or halogenated alkenyloxy with 2 or 3 C-atoms.

4. The liquid crystal medium according to claim 1, wherein the one or more compounds of formula III are selected from compounds of formulae III-1 and/or III-2

III-1

III-2 in which

R³, independently of one another, denote a straight-chain alkyl or alkoxy radical that is unsubstituted or halogenated and has 1 to 15 C atoms, or a branched alkyl or alkoxy radical that is unsubstituted or halogenated and has 3 to 15 C atoms, where one or more CH₂ groups in these radicals may each be replaced, independently of one another, by —C≡C—, —CF₂O—, —CH=CH—, —O—, —CO—O— or —O—CO— in such a way that O atoms are not linked directly to one another, independently of one another denote L³¹ and L³² independently of each other, denote H or F, X³ independently of each other, denote halogen, halogenated alkyl or halogenated alkoxy with 1 to 3 C-atoms or halogenated alkenyl or halogenated alkenyloxy with 2 or 3 C-atoms, and n and o are, independently of each other, 0 or 1.

5. The liquid crystal medium according to claim 1, wherein the medium further comprises one or more compounds selected from the group consisting of the compounds of formulae Y, B, BC, CR, PH-1 and/or PH-2:

Y

B

BC

CR

PH-1

-continued

PH-2

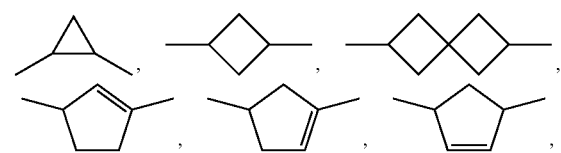

in which

R$^{Y1}$, R$^{Y2}$, R$^{B1}$, R$^{B2}$, R$^{CR1}$, R$^{CR2}$, R$^{P1}$, and R$^{P2}$ each, independently of one another, denote H, an alkyl or alkoxy radical having 1 to 15 C atoms, where one or more CH$_2$ groups in these radicals may each be replaced, independently of one another, by —CH═CH—, —C≡C—, —CF$_2$O—, —OCF$_2$—, —O—, —CO—O— or —O—CO— in such a way that O atoms are not linked directly to one another, and in which one or more H atoms may be replaced by halogen, on each occurrence, independently of one another, denote a) 1,4-cyclohexenylene or 1,4-cyclohexylene radical, in which one or two non-adjacent CH$_2$ groups may be replaced by —O— or —S—, b) a 1,4-phenylene radical, in which one or two CH groups may be replaced by N, or c) a radical from the group spiro[3.3]heptane-2,6-diyl, 1,4-bicyclo[2.2.2]octylene, naphthalene-2,6-diyl, decahydronaphthalene-2,6-diyl, 1,2,3,4-tetrahydronaphthalene-2,6-diyl, phenanthrene-2,7-diyl and fluorene-2,7-diyl, where the radicals a), b) and c) may be mono- or polysubstituted by halogen atoms, Z$^x$, Z$^y$ identically or differently denote —CH$_2$CH$_2$—, —CH═CH—, —CF$_2$O—, —OCF$_2$—, —CH$_2$O—, —OCH$_2$—, —CO—O—, —O—CO—, —C$_2$F$_4$—, —CF═CF—, —CH═CH—CH$_2$O—, or a single bond, Z$^1$ on each occurrence independently of one another denotes —CO—O—, —O—CO—, —CF$_2$O—, —OCF$_2$—, —CH$_2$O—, —OCH$_2$—, —CH$_2$—, —CH$_2$CH$_2$—, —(CH$_2$)$_4$—, —CH═CH—CH$_2$O—, —C$_2$F$_4$—, —CH$_2$CF$_2$—, —CF$_2$CH$_2$—, —CF═CF—, —CH═CF—, —CF═CH—, —CH═CH—, —C≡C— or a single bond, L$^{Y1}$, L$^{Y2}$, L$^{B1}$ and L$^{B2}$ each, independently of one another, denote F, Cl, CF$_3$ or CHF$_2$, W denotes O or S, n is 0, 1 or 2, c is 0, 1 or 2, x and y independently are 0, 1 or 2, where x+y≤3.

6. The liquid crystal medium according to claim 1, wherein the medium further comprises one or more compounds of formula VII,

VII in which

R$^{71}$ and R$^{72}$ denote H, F, straight chain alkyl or alkoxy having 1 to 15 C atoms, straight chain alkenyl or alkenyloxy having 2 to 15 C atoms or branched alkyl, alkoxy, alkenyl, alkenyloxy each having 3 to 15 C atoms, where one or more CH$_2$ groups in these radicals may each be replaced, independently of one another, by —C≡C—, —CF$_2$O—, —OCF$_2$—, —CH═CH—, —O—, —CO—O— or —O—CO— in such a way that O atoms are not linked directly to one another, and in which one or more H atoms may be replaced by halogen, X$^{71}$, X$^{72}$, X$^{73}$, X$^{74}$, X$^{75}$ and X$^{76}$, identically or differently, denote H or F, Z$^{71}$ and Z$^{72}$, identically or differently, denote CH$_2$CH$_2$ or a single bond.

7. The liquid crystal medium according to claim 1, wherein the medium further comprises one or more compounds of formula IV

IV in which

R$^{11}$ denotes a straight-chain alkyl radical having 1 to 12 C atoms or a branched or cyclic alkyl radical having 3 to 12 C atoms, or a straight-chain alkenyl radical having 2 to 12 C atoms or a branched alkenyl radical having 3 to 12 C atoms or a cyclic alkenyl radical having 5 to 12 C atoms, wherein one or more H atoms are optionally replaced by fluorine, R$^{12}$ denotes a straight chain alkyl or alkoxy radical having 1 to 12 C atoms or a branched or cyclic alkyl or alkoxy radical having 3 to 12 C atoms, or a straight chain alkenyl radical having 2 to 12 C atoms or a branched alkenyl radical having 3 to 12 C atoms or a cyclic alkenyl radical having 5 to 12 C atoms, wherein one or more H atoms are optionally replaced by fluorine.

8. The liquid crystal medium according to claim 7, wherein the one or more compounds of formula IV comprise one or more compounds of formulae IVa and/or IVb, IVa IVb in which $R^{41}$ and $R^{42}$ each, independently of one another, denote a straight-chain alkyl, alkoxy, alkenyl, alkoxyalkyl or alkenyloxy radical having up to 12 C atoms, denotes and $Z^4$ denotes a single bond, —CH$_2$CH$_2$—, —CH=CH—, —CF$_2$O—, —OCF$_2$—, —CH$_2$O—, —OCH$_2$—, —COO—, —OCO—, —C$_2$F$_4$—, —C$_4$H$_8$—, or —CF=CF—.

9. The liquid crystal medium according to claim 1, further comprising one or more compounds of formula V

V in which $R^{51}$, $R^{52}$ denote alkyl having 1 to 7 C atoms, alkoxy having 1 to 7 C atoms, or alkoxyalkyl, alkenyl or alkenyloxy having 2 to 7 C atoms, identically or differently, denote $Z^{51}$, $Z^{52}$ each, independently of one another, denote —CH$_2$—CH$_2$—, —CH$_2$—O—, —CH=CH—, —C≡C—, —COO— or a single bond, and n is 1 or 2.

10. The liquid crystal medium according to claim 1, further comprising one or more compounds of formula VIII

VIII in which $R^{81}$ and $R^{82}$, identically or differently, denote H, halogen, CN, SCN, straight chain alkyl or alkoxy having 1 to 15 C atoms, straight chain alkenyl or alkenyloxy having 2 to 15 C atoms or branched alkyl, alkoxy, alkenyl or alkenyloxy having 3 to 15 C atoms, where one or more CH$_2$ groups in these radicals may each be replaced, independently of one another, by —C≡C—, —CF$_2$O—, —OCF$_2$—, —CH=CH—, by —O—, —CO—O— or —O—CO— in such a way that O atoms are not linked directly to one another, and in which one or more H atoms may be replaced by halogen, $A^0$, $A^{81}$, and $A^{82}$, each, independently of one another, denote phenylene-1,4-diyl, in which one or two CH groups may be replaced by N and one or more H atoms may be replaced by halogen, CN, CH$_3$, CHF$_2$, CH$_2$F, CF$_3$, OCH$_3$, OCHF$_2$ or OCF$_3$, cyclohexane-1,4-diyl, in which one or two non-adjacent CH$_2$ groups may be replaced, independently of one another, by O and/or S and one or more H atoms may be replaced by F, cyclohexene-1,4-diyl, bicyclo[1.1.1]-pentane-1,3-diyl, bicyclo[2.2.2]octane-1,4-diyl, spiro[3.3]heptane-2,6-diyl, tetrahydropyran-2,5-diyl or 1,3-dioxane-2,5-diyl;

$Z^{81}$ and $Z^{82}$, each, independently of one another, denote —CF$_2$O—, —OCF$_2$—, —CH$_2$O—, —OCH$_2$—, —CO—O—, —O—CO—, —C2H$_4$—, —C$_2$F$_4$, —CF$_2$CH$_2$—, —CH$_2$CF$_2$—, —CFHCFH—, —CFHCH$_2$—, —CH$_2$CFH—, —CF$_2$CFH—, —CFHCF$_2$—, —CH═CH—, —CF═CH—, —CH═CF—, —CF═CF—, —C≡C— or a single bond;

n denotes 0, 1, 2 or 3, and m denotes 0, 1, 2 or 3.

11. A liquid crystal display, comprising the liquid-crystal medium according to claim 1.

12. The liquid crystal display according to claim 11, wherein the display is configured to operate in the IPS or FFS mode.

13. A compound of the formula I

I in which

R$^{11}$ and R$^{12}$ identically or differently, denote H, straight chain alkyl or alkoxy having 1 to 15 C atoms, straight chain alkenyl or alkenyloxy having 2 to 15 C atoms or branched alkyl, alkoxy, alkenyl, alkenyloxy each having 3 to 15 C atoms, where one or more CH$_2$ groups in these radicals may each be replaced, independently of one another, by —CH═CH—, —C≡C—, —CF$_2$O—, —OCF$_2$—, —O—, —CO—O— or —O—CO— in such a way that O atoms are not linked directly to one another, and in which one or more H atoms may be replaced by halogen, and L$^{11}$ and L$^{12}$ denote H, F, Cl, CH$_3$, CF$_3$ or CHF$_2$; wherein L$^{11}$ and L$^{12}$ do not both denote H and if one of L$^{11}$ and L$^{12}$ denotes F the other of L$^{11}$ and L$^{12}$ is not Cl.

14. A process for the production of the compound of the formula I of claim 13, comprising at least the step of elimination of water from the compound of the formula (3)

(3)

in which

R$^{11}$ and R$^{12}$ identically or differently, denote H, straight chain alkyl or alkoxy having 1 to 15 C atoms, straight chain alkenyl or alkenyloxy having 2 to 15 C atoms or branched alkyl, alkoxy, alkenyl, alkenyloxy each having 3 to 15 C atoms, where one or more CH$_2$ groups in these radicals may each be replaced, independently of one another, by —CH═CH—, —C≡C—, —CF$_2$O—, —OCF$_2$—, —O—, —CO—O— or —O—CO— in such a way that O atoms are not linked directly to one another, and in which one or more H atoms may be replaced by halogen, and L$^{11}$ and L$^{12}$ denote H, F, Cl, CH$_3$, CF$_3$ or CHF$_2$; wherein L$^{11}$ and L$^{12}$ do not both denote H and if one of L$^{11}$ and L$^{12}$ denotes F the other of L$^{11}$ and L$^{12}$ is not Cl.

15. A compound of the formula I prepared according to the process of claim 14.

* * * * *